(12) United States Patent
Dunsmuir

(10) Patent No.: US 7,330,538 B2
(45) Date of Patent: Feb. 12, 2008

(54) CLOSED-LOOP COMMAND AND RESPONSE SYSTEM FOR AUTOMATIC COMMUNICATIONS BETWEEN INTERACTING COMPUTER SYSTEMS OVER AN AUDIO COMMUNICATIONS CHANNEL

(75) Inventor: Martin R. M. Dunsmuir, Waianae, HI (US)

(73) Assignee: GotVoice, Inc., Kirkland, WA (US)

( * ) Notice: Subject to any disclaimer, the term of this patent is extended or adjusted under 35 U.S.C. 154(b) by 938 days.

(21) Appl. No.: 10/403,350

(22) Filed: Mar. 27, 2003

(65) Prior Publication Data

US 2003/0187655 A1 Oct. 2, 2003

Related U.S. Application Data

(60) Provisional application No. 60/368,644, filed on Mar. 28, 2002.

(51) Int. Cl.
*H04M 11/06* (2006.01)
(52) U.S. Cl. .................... 379/88.18; 704/270
(58) Field of Classification Search ............. 379/88.18; 704/270
See application file for complete search history.

(56) References Cited

U.S. PATENT DOCUMENTS

| | | | |
|---|---|---|---|
| 3,937,889 A | 2/1976 | Bell, III et al. ............ 179/2 DP |
| 3,978,288 A | 8/1976 | Bruckner et al. ......... 179/1.5 R |
| 4,060,694 A | 11/1977 | Suzuki et al. ............. 179/1 SD |
| 4,071,888 A | 1/1978 | Owens ....................... 364/200 |
| 4,117,263 A | 9/1978 | Yeh .......................... 179/1 SM |
| 4,196,311 A | 4/1980 | Hoven ......................... 370/48 |
| 4,327,251 A | 4/1982 | Fomenko et al. ........ 179/1 SM |
| 4,612,416 A | 9/1986 | Emerson et al. ........... 179/6.11 |
| 4,790,003 A | 12/1988 | Kepley et al. ................ 379/88 |
| 4,837,798 A | 6/1989 | Cohen et al. ................. 379/88 |
| 4,935,954 A | 6/1990 | Thompson et al. ........... 379/89 |
| 5,528,728 A | 6/1996 | Matsuura et al. ......... 395/2.41 |
| 5,822,405 A | 10/1998 | Astarabadi .................. 379/88 |
| 5,915,001 A | 6/1999 | Uppaluru ................. 379/88.22 |
| 6,052,442 A | 4/2000 | Cooper et al. ........... 379/88.19 |
| 6,088,428 A | 7/2000 | Trandal et al. ........... 379/88.02 |
| 6,157,705 A | 12/2000 | Perrone ................... 379/880.1 |
| 6,173,042 B1 | 1/2001 | Wu ........................ 379/88.04 |
| 6,208,966 B1 | 3/2001 | Bulfer ........................ 704/251 |
| 6,263,052 B1 | 7/2001 | Cruze ...................... 379/88.18 |
| 6,295,341 B1 | 9/2001 | Muller .................... 379/88.18 |
| 6,321,194 B1 | 11/2001 | Berestesky ................. 704/232 |
| 6,324,499 B1 | 11/2001 | Lewis et al. ................ 703/233 |
| 6,327,345 B1 | 12/2001 | Jordan ..................... 379/88.02 |
| 6,330,308 B1 | 12/2001 | Cheston, III et al. ..... 379/88.04 |
| 6,335,962 B1 | 1/2002 | Ali et al. ................. 379/88.11 |

(Continued)

*Primary Examiner*—Gerald Gauthier
(74) *Attorney, Agent, or Firm*—Ronald M. Anderson

(57) ABSTRACT

A system and method for enabling two computer systems to communicate over an audio communications channel, such as a voice telephony connection. Such a system includes a software application that enables a user's computer to call, interrogate, download, and manage a voicemail account stored on a telephone company's computer, without human intervention. A voicemail retrieved from the telephone company's computer can be stored in a digital format on the user's computer. In such a format, the voicemail can be readily archived, or even distributed throughout a network, such as the Internet, in a digital form, such as an email attachment. Preferably a computationally efficient audio recognition algorithm is employed by the user's computer to respond to and navigate the automated audio menu of the telephone company's computer.

30 Claims, 19 Drawing Sheets

U.S. PATENT DOCUMENTS

| | | | |
|---|---|---|---|
| 6,335,963 B1 | 1/2002 | Bosco | 379/88.12 |
| 6,337,977 B1 | 1/2002 | Ranta | 455/413 |
| 6,339,591 B1 | 1/2002 | Migimatsu | 370/352 |
| 6,341,160 B2 | 1/2002 | Tverskoy et al. | 379/88.13 |
| 6,341,264 B1 | 1/2002 | Kuhn et al. | 704/255 |
| 6,345,250 B1 | 2/2002 | Martin | 704/260 |
| 6,345,254 B1 | 2/2002 | Lewis et al. | 704/275 |
| 6,442,242 B1 | 8/2002 | McAllister et al. | 379/67.1 |
| 6,487,278 B1 | 11/2002 | Skladman et al. | 379/88.13 |
| 7,170,979 B1 * | 1/2007 | Byrne et al. | 379/88.18 |

* cited by examiner

CLOSED-LOOP COMMAND AND RESPONSE SYSTEM FOR AUTOMATIC COMMUNICATIONS BETWEEN INTERACTING COMPUTER SYSTEMS OVER AN AUDIO COMMUNICATIONS CHANNEL

RELATED APPLICATIONS

This application is based on a prior copending provisional application Ser. No. 60/368,644, filed on Mar. 28, 2002, the benefit of the filing date of which is hereby claimed under 35 U.S.C. § 119(e).

FIELD OF THE INVENTION

The present invention pertains to a method and apparatus that allows two computer systems to communicate over an audio communications channel, including enabling a two-way exchange of multimedia messages.

BACKGROUND OF THE INVENTION

A voice response (VR) system allows a human user to listen to spoken information generated by a computer system. The user enters dual tone multi-frequency (DTMF) tones, or speaks commands, to navigate through the functions of such a VR system.

The implementation of VR systems that respond to tones or spoken commands is well known, but these systems are designed with the assumption that humans will be providing the commands to a computer over a communication link. Furthermore, these systems are typically designed to use human speech in the form of stored audio files that are played over the telephone line in order to communicate with the outside world. Communication with VR systems is thus normally via an analog interface. U.S. Pat. Nos. 4,071,888 and 4,117,263 are representative of basic patents in the field of VR systems. Modern VR systems are largely similar to the centralized systems described in these patents.

In contrast to VR systems, electronic mail (email) employs digital electronic signals for communications between users. Messages are encoded as numbers and sent from place to place over digital computer networks. Furthermore, email can be used to exchange voice messages in the form of digital audio files. However, the interface between email software systems and the underlying network is digital—not analog.

As a result of this analog-digital interface dichotomy, there is currently virtually no integration between voicemail and email. Since voicemail is the most common application of VR systems today, it is the best example. Accessing a voicemail system using a telephone handset, a user may listen to commands and send DTMF (Touchtone®) responses in order to listen to, save, forward, and delete their voicemail messages. However, commercial voicemail systems have a limited message capacity (both in time and space), and the lack of a digital interface in voicemail systems makes integration of voicemail with email and digital audio difficult. Not only is voicemail management using traditional dial-in systems cumbersome, it can be expensive, as cellular and mobile phone users must often incur the user peak-rate phone charges to access their voicemail. In addition, if the user has multiple telephones with voicemail accounts then each voicemail account must be checked with a separate phone call, and the user must manage each voicemail box separately. Voicemail is therefore a transient, untrustworthy, and cumbersome medium for communication.

Note that email and voicemail systems both use a "store & forward" model for message delivery. It would thus be desirable to construct a bridge between them (allowing voicemail to reach the Internet and Internet audio messages to reach the phone system), which should enable a number of applications of great utility to be implemented. For example, if voicemail messages were available on a user's computer in digital form and freely available for distribution via email, then several advantages to users of voicemail systems would result. For example, such a system would enable the following benefits: (1) voicemail messages could be captured securely and permanently, just like any other type of computer file; (2) voicemail messages could be distributed and used wherever digital audio files are used, in particular, for transmission to remote locations via email (note the cost of retrieving email remotely is far lower than the long distance charges or peak roaming charges that may be incurred to make calls to voicemail); and, (3) because no direct connection is required to a modem, except at one location (the server), users would be able to receive voicemail on non-telephone devices, i.e., with the same devices used for email.

The prior art identifies the value of integrating voicemail with computers and in particular, personal computers (PCs). U.S. Pat. No. 6,339,591, for example, describes a system for sending voicemail messages over the Internet, using proprietary methods (i.e., not email). The most likely configuration that might be used to integrate voicemail with the computer network would effect this integration at the centralized voicemail switch. In such a system, because voicemail messages are stored as digital audio files on the voicemail switch and because that switch is on the computer network, those voicemail messages might then be made available to computers on the network.

U.S. Pat. No. 5,822,405 discloses a method of using a PC or other device equipped with a special modem to retrieve voicemail over a telephone line and store each message in a file on the computer; however, this patent makes no mention of digital distribution of the voicemail messages retrieved. This patent comes close to solving the central problem of interacting between a computer and a VR system, namely the need to use speech recognition in many cases, but room for improvement exists. For example, improvements can be made in the analysis of the audio signals received by a user's computer, and no utility is provided in this prior art patent for the digital distribution of the retrieved messages.

Where voicemail messages are to be saved for later use in a conventional voicemail system, the voicemail messages are kept stored within the voicemail system. For example, U.S. Pat. Nos. 6,295,341; 4,327,251; 6,337,977; and 6,341,160 describe such systems. Even when computers are employed, the messages are generally kept in the answering device (as disclosed in U.S. Pat. No. 6,052,442). U.S. Pat. No. 6,335,963 even teaches that email be employed for notifying a user of voicemail, but not for delivery of the messages themselves.

There is much use made of voice recognition in VR applications, but in almost all these applications, voice recognition is used by a computer to recognize the content of a human voice speaking on the telephone (e.g., as taught in U.S. Pat. Nos. 6,335,962; 6,330,308; 6,208,966; 5,822,405; and 4,060,694). Such human voice recognition techniques are computationally expensive. Readily available human voice recognition applications compare real-time spoken words against a stored dictionary. Because of variations in the human spoken word and variations in the quality of the communications channels, the comparison of a spoken word with a dictionary of words must take into account variations in both the length and the spectral characteristics of the human speech being recognized. Thus, solving the problem of human speech recognition in real-time consumes significant computational resources, which effectively limits the applications of human speech recognition used in conjunction with fast, relatively expensive, computers. Where non-standard audio recognition methods are used, they are typically restricted to narrow applications, as disclosed in U.S. Pat. Nos. 6,324,499; 6,321,194, and 6,327,345.

It should be noted that VR systems often emulate (i.e., "speak") the human voice, but do not produce it. Instead, they use stored audio files that are played over the telephone communication link. Therefore, the speech that these VR systems produce is identically spoken every time it is played. The recognition of repetitive identical audio signatures is, in fact, a much simpler problem to solve than the problem of recognizing actual spoken human voice produced by a variety of speakers. It would be preferable to provide a system employing such techniques for recognizing stored audio file speech, thereby enhancing computational performance and enabling less expensive processors to be employed.

Another issue with conventional voice-recognition methods applied to VR applications is that the recognition of whole words and phrases can involve considerable latency. In VR applications, it is preferable to keep recognition latency to a minimum to avoid lost audio and poor response. Reduced processing overhead within the application will allow latency to be reduced within the recognition system.

In the prior art, voice recognition is always proceeded by a learning step, where the recognizing computer system processes speech audio to build a recognizer library. Many VR and voice recognition inventions include such a learning process, which may be used to teach the computer what to say, what tones to send, or what words to recognize (e.g., as disclosed in U.S. Pat. Nos. 6,345,250; 6,341,264; and 5,822, 405). It should be noted that in the prior art, when a system is learning words to be recognized, the learning method is independent of the context of the audio being learned. That is to say, the recognition method stands alone and can distinguish between a word being recognized and all other words (at least theoretically). It would thus be desirable to provide a computer-driven VR system wherein the learning method is simplified to take into account the invariant nature of the messages and the known context of their expression, to require fewer computational resources to be employed.

Much prior art in the field of automatic control of VR systems with a computer depends upon the calling computer knowing the context of the VR system at all times. For example, the application described in U.S. Pat. No. 6,173, 042 assumes that the VR system works identically every time, and that tones can be input to the VR system at any time. The prior art recognizes that the context of recognition is important (e.g. as disclosed in U.S. Pat. No. 6,345,254). It would be desirable to provide a programming language to describe VR interactions, which includes a syntax powerful enough to express such context in a general manner.

Many VR control applications (such as described in U.S. Pat. No. 5,822,405) use some form of interpreted programming language to tell the application how to drive the remote VR system. In the prior art however, the scripting language is of a very restricted syntax, specific to its application (for example, voicemail retrieval). In order to build a general purpose VR response system, it would be helpful to have a programming language that is sufficiently powerful to address a wide range of VR applications (e.g., retrieval of stock quotes, airline times, or data from an online banking application).

Another aspect of the learning process that can have a major impact on its efficiency is the user interface (UI). A UI that is too generalized may result in complex manipulations of the interface being required to achieve full control of the learning process. Such a situation arises often when the learning portion of an invention's embodiment is performed with a general purpose tool, as is in U.S. Pat. No. 5,822,405. It would be desirable to provide a computer-driven VR system, wherein the UI is specifically adapted to enable easy navigation and control of all of the aspects of the VR system, including any learning method required.

A different issue with conventional voice recognition methods applied to VR applications, is that the recognition of whole words and phrases can involve considerable latency. It would be desirable to provide a computer-driven VR system, wherein recognition latency is kept to a minimum to avoid lost audio content and poor response.

When designing a VR control application (such as described in U.S. Pat. No. 5,822,405) it may be necessary to develop some form of interpreted programming language, to tell the application how to drive the remote VR system. In the prior art, however, the scripting language is of a very restricted syntax, specific to its application (for example, voicemail retrieval). In order to build a general purpose VR response system, it would be desirable to employ a programming language that is sufficiently powerful and more general in nature to address a wide range of VR applications (e.g., retrieval of stock quotes, airline times, or for accessing data in an online banking application). If a bridge such as that noted above can be built between voicemail and the Internet, it would make voicemail as easy to review, author, and send, as email. Voicemail, originating in the telephone system, might be integrated directly with messages created entirely on the Internet using an audio messaging application.

Many integrated messaging systems have been built. These systems seek to integrate some combination of voicemail, text messaging, and email into one interface. However, the prior art with respect to unified messaging (UM) is exclusively concerned with creating a closed universe within which the system operates. Such systems, although at times elegant, do not cater to users who have a need to access voicemail from different voicemail systems (such as from home and from work), through an Internet connection. For example, U.S. Pat. No. 6,263,052 archives the voice messages within the voicemail system. It would be desirable to enable the voicemail messages to be available on the computer network, thereby enabling a user to reply to those messages offline, and to forward the reply to the original caller using email, or to make a voicemail response that is delivered by the computer system. If integrated messaging systems could interface directly with any VR system over the public service telephone network (PSTN), then UM would become easier to apply, and would also become more useful.

Often after voicemail messages are received, a user will wish to reply to such messages. It is convenient for the user to be able to reply to the voicemail at their leisure, and have the reply forwarded to the original sender as another voicemail. Such a system is described in U.S. Pat. No. 6,263,052.

In the prior art it is assumed that if two computers are to communicate with each other they will do so using some form of digital encoding, and that if they are using a telephone line to communicate they will modulate a signal on that line with an audio signal that follows the structure of the digital sequence they wish to communicate. U.S. Pat. Nos. 4,196,311 and 3,937,889 are exemplary of such art. On the other hand, humans communicate with each other over the telephone using analog, not digital, communications. However, if two computer systems, each equipped with voice recognition and the ability to communicate using analog voice communications, were placed in communication with each other in a peer-to-peer configuration, a useful form of two-way communication might result. If the recognition of audio from one computer can drive a program on the other computer, which can in turn send audio responses to the first computer, then secure encoded communications might be effected by use of a normal telephone voice call.

Clearly, it would be desirable to provide a software system, running on a suitably equipped computer, which can be flexibly programmed and easily taught to navigate a VR system using audio signature recognition and which can download chosen audio segments to the computer system as digital audio files. Such a system will preferably enable the automatic scheduled retrieval of audio files from the VR system and enable these files to be automatically forwarded via email to the intended recipient, over the Internet.

It would further be desirable for digital audio files to be played over the telephone system and to leave voicemail messages that can be played directly by the recipient. Yet another desirable feature of such a system would be the use of computationally efficient waveform recognition algorithms to maximize the number of telephone lines that can be simultaneously supported by one computer.

It would still be further desirable to provide flexible interfaces, functions, and programming language to enable general purpose applications to interface with the VR retrieval and forwarding system. Such a system would automatically recognize duplicate audio files (i.e., files which have been downloaded twice from the same VR system), and provide means for the user to prepare digital audio files as replies to received messages, or as new voice messages, and to have those digital audio files delivered via email or over the phone line, to the intended recipient.

Further desirable features of such a system would include means for teaching the software to recognize new audio signatures and to incorporate them into a program script, and such learning processes should be enabled both locally (at a computer with a modem), and remotely (by employing a computer and a modem receiving commands via email from a remote computer). It would further be desirable to provide a system that enables two computers to communicate over an audio communications channel, to achieve an audio encoded computer-to-computer communications system.

SUMMARY OF THE INVENTION

The present invention is directed to a system and method for enabling two computer systems to communicate over an audio communications channel, such as a voice telephony connection. Another aspect of the invention is directed to an Internet and telephony service utilizing the method of the present invention.

One of a number of preferred embodiments of this invention is directed to the use of a VR management application to automate interaction with a VR system. In a preferred implementation, the VR management application resides on a server, and multiple users can access the VR management application remotely. Users teach the VR management application how to access one or more VR systems associated with each of the users. For each audio command prompt likely to be issued by the VR system, the VR management application learns to recognize the audio command prompt, and how to respond to that audio command prompt. A user can then instruct the VR management application to automatically interact with the VR system to achieve a result, based upon a desired level of interaction. In a preferred embodiment, the interaction includes retrieving the user's voicemail. The VR management application will establish a logical connection with the VR system, receive audio communications from the VR system, and compare each communication with the audio command prompts that were previously learned. The VR management application provides the appropriate responses and receives additional audio communications, until a desired level of interaction is achieved. When the desired level of interaction is retrieving voicemail, a user is preferably enabled to receive such voicemail either via email, via a network location, or via a telephone.

In a preferred embodiment, the learning process includes generating a discrete Fourier transform (DFT) based on at least a portion of each audio command prompt to be learned. When the VR management application automatically interacts with a VR system, at least one DFT will be generated, based on the audio communication received from the VR system. Each learned DFT will be compared with the newly generated DFT to recognize the command prompt corresponding to the audio received.

Another aspect of the present invention is a computationally efficient method of recognizing an audio signal. The method requires that a plurality of known DFTs be provided, each known DFT corresponding to a specific audio signal. At least one unknown DFT is generated for each audio signal to be recognized. The at least one unknown DFT is compared to each known DFT, and a match with a known DFT enables the audio signal to be identified.

Preferably, the audio signal to be identified is stored in an audio buffer, and the audio buffer is separated into a plurality of equally-sized sample buffers. Then, an unknown DFT is generated for each sample buffer. Each unknown DFT is compared to each known DFT. When an audio signal is processed to produce a plurality of unknown DFTs, one or more of a plurality of DFTs generated from a known audio signal is selected to be used as the known DFT for that audio signal.

Another aspect of the invention is directed to a method for using a computing device to interact with a VR system. In at least one embodiment, the VR system is an audio message service, and the interaction is managing a user's voicemail account, including retrieving audio messages from the remote audio message service. While not limited to use with VR systems that comprise an audio message service, when so employed, the method includes the steps of first establishing a logical connection between the computing device and the audio message service. Then a communication is received from the audio message service. In response, the computing device generates at least one unknown DFT based on the communication. The at least one unknown DFT is compared with at least one known DFT. Each known DFT corresponds to a command prompt that is likely to be received from the message service. If an acceptable level of correlation exists between the at least one unknown DFT and a known DFT, then the computing device provides the message service with the appropriate response to the command prompt identified by matching the at least one DFT to the known DFT. The steps of receiving a communication, generating unknown DFTs, matching unknown DFTs to known DFTs, and providing a correct response to the message service are repeated until the communication from the message service indicates that the next communication will be an audio message, rather than a command prompt. The messages stored by the message service are then retrieved.

The logical connection is preferably a telephonic connection. Once the messages are retrieved, the computing device optionally provides the message service with the appropriate response required to instruct the message service to delete each message after it has been received by the computing device. In one related embodiment, instead of causing the message service to delete retrieved messages, the computing device generates a key for each message received from the message service, so that during a future message retrieval operation, the computing device can ignore already received messages that have not been deleted from the message service. Preferably, the keys are produced by generating a DFT of the message, and encoding the DFT to generate a unique key that is stored using relatively few bytes. Then, before retrieving a message, the computing device generates a key for an incoming message and checks the key for the incoming message against stored keys. If the key for the incoming message is the same as a stored key, the incoming message is ignored, since it was previously retrieved.

Preferably, before the logical connection is established to retrieve messages stored by the message service, the computing device is taught how to recognize and respond to each command prompt likely to be received from the message service. To teach the computing device how to recognize and respond to each command prompt likely to be encountered, a logical connection is first established between the computing device and the message service. A command prompt is received from the message service, and at least one DFT based on the command prompt is generated. A user provides the correct response to the command prompt, and the computing device stores the correct response, as well as the DFT corresponding to the command prompt. Preferably, the correct response is stored as a program script that enables the computing device to duplicate the correct response for the DFT. The program script and DFT corresponding to that command prompt are stored in a memory accessible to the computing device. These steps are repeated for each command prompt likely to be encountered.

To enhance the method of retrieving an audio message described above, preferably each communication received from the message service is stored in at least one audio buffer. Then, each audio buffer is separated into a plurality of window buffers. A DFT is generated for each window buffer. Each window buffer DFT is then compared with each known DFT.

In one preferred embodiment two different, identically-sized audio buffers are used. Each audio buffer is sized to accommodate N samples, N having been selected to reflect a desired time resolution. Each audio buffer is sequentially filled with N samples of the communication, such that a first audio buffer is filled with older samples, and a second audio buffer is filled with newer samples. A plurality of window buffers are generated by segregating each audio buffer of size N into identically sized sample windows of size W, such that each sample window includes a whole number of samples, and such that N is both a whole number and a multiple of W. The next step involves iteratively generating window buffers of size N using the sample windows of size W, such that each window buffer includes multiple sample windows (totaling N samples), and each sequential window buffer includes one sample window (of size W) not present in the preceding window buffer.

Preferably, any messages that are retrieved are stored in a digital format. Once in a digital format, the messages can be forwarded to a user's email address. It is also preferred to enable the user to access any stored message at a networked location. A preferred digital format is the MP3 file format, but other formats might alternatively be used.

It is contemplated that the computing device will be programmed to establish a connection with a message facility according to a predefined schedule, so that messages are retrieved on a defined reoccurring basis.

Still another aspect of the present invention is directed to a method of training a computing device to automatically interact with a VR system, where successful interaction requires providing a proper audio response to audio prompts issued by the VR system. While not limited to VR systems such as voicemail services, one preferred embodiment is directed to training a computing device to automatically manage a voicemail account, including retrieving, saving, and deleting messages. Steps of the method include launching a message retrieval application on the computing device, and then establishing a logical connection between the computing device and the remote message facility using either a telephonic connection or a network connection. Further steps include receiving a communication from the remote message facility, and then capturing a command prompt from the remote message facility in an audio buffer. A correct response to the audio command prompt (such as DTMF tone sequence or a audio message) is required to navigate a menu associated with the remote message facility to retrieve the desired messages. A user is enabled to provide the correct response, which is stored in a memory of the computing device. Additional steps include generating at least one DFT based on at least a portion of the audio buffer, the at least one DFT identifying the command prompt and thereby enabling the computing device to automatically recognize the command prompt during a subsequent automated message retrieval operation. A program script is generated for execution by the computing device, to duplicate the correct response. The final step requires storing the at least one DFT and the program script in a memory accessible by the computing device, such that the at least one DFT and program script enable the computing device to automatically recognize the command prompt and duplicate the correct response to the command prompt during a subsequent automated message retrieval operation.

Preferably, the steps are repeated so that at least one DFT and a program script are generated for each different command prompt likely to be encountered when navigating a menu associated with the remote message facility. The computing device then automatically recognizes all command prompts likely to be issued by the remote message facility, and duplicates the correct response for each such command prompt during a subsequent automated message retrieval operation.

It is further preferred that the contents of the audio buffer be separated into a plurality of equally sized sample buffers before generating the at least one DFT. The step of generating the at least one DFT preferably includes generating a plurality of sample DFTs, one for each sample buffer.

Still another aspect of the present invention is directed to a method for enabling two computing devices to communicate using audio signals. Each computing device is provided a plurality of known DFTs that each corresponds to a specific audio signal. When a first of the two computing devices receives an input signal, the input signal is processed to perform one of the following functions. If the input signal is not an audio signal, then the input signal is converted into an audio signal, such that the audio signal thus generated corresponds to an audio signal whose DFT is stored in the memory of each computing device; the audio signal is then transmitted to the second of the two computing devices. If the input signal is already an audio signal but there is no known DFT corresponding to that input signal, then the input signal is separated into a plurality of audio signals such that each of the plurality of audio signals corresponds to an audio signal whose DFT is stored in the memory of each computing device, and each audio signal is transmitted to the second computing device. If the input signal is already an audio signal and there is a known DFT corresponding to that input signal, then that audio signal is transmitted to the second computing device. The second computing device processes each audio signal it receives by generating an unknown DFT based on an audio signal received, comparing the unknown DFT generated from the audio signal received with each known DFT, and identifying the audio signal received to reconstruct the input signal. The second computing device can then respond to the first computing device in the same manner.

Still another aspect of the present invention is directed to a method for enabling a user to retrieve a digital copy of an audio message from a network location, when the audio message has been left at an audio message facility. The audio message facility provides audio command prompts to which appropriate responses must be made in order to successfully navigate through the audio message facility to retrieve any audio messages. The method involves the steps of establishing a logical connection between the user and the network location, and enabling the user to teach the network location how to recognize and respond to the audio command prompts issued by each audio message facility utilized by the user. The recognition is based on a comparison of a DFT of an audio command prompt with stored DFTs corresponding to each command prompt likely to be issued by each audio message facility utilized by the user. The method further involves enabling the user to instruct the network location to retrieve audio messages from at least one audio message facility utilized by the user. For each audio message facility utilized by the user from which the network location has been instructed to retrieve messages, the following steps are performed. A logical connection between the network location and the message facility is established to receive an audio signal from the message facility. An unknown DFT is generated based on the audio signal received. The unknown DFT generated from the audio signal received is compared with each known DFT to identify the command prompt being issued by the message facility, and the correct response to the command prompt is provided. These steps are repeated until access to messages stored by the message facility is granted. The messages are retrieved and converted into a digital format, so that the user is able to access the messages in the digital format.

Other aspects of the present invention are directed to a system for executing steps generally consistent with the steps of the methods described above and to articles of manufacture intended to be used with computing devices, which include a memory medium storing machine instructions. The machine instructions define a computer program that when executed by a processor, cause the processor to perform functions generally consistent with the method steps described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

General Overview

Figure 1A:
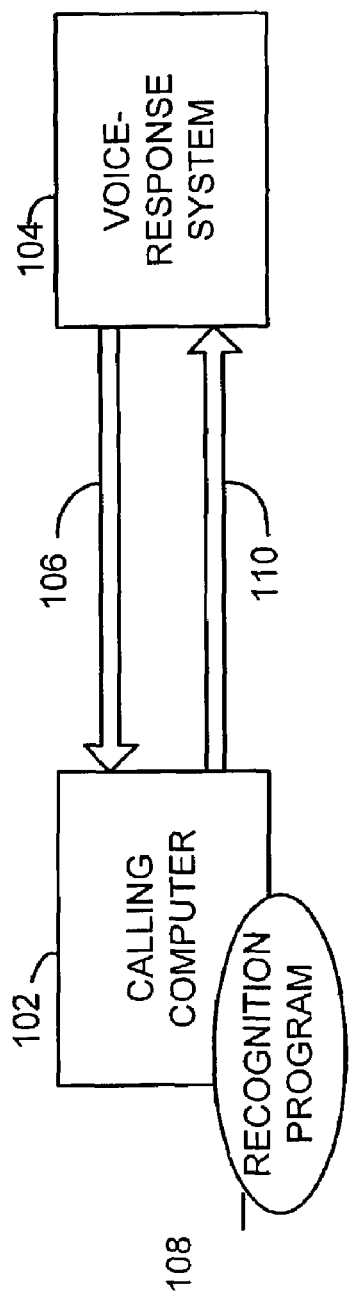
FIG. 1A is a schematic block diagram illustrating a computer that is using the present invention and is in communication with a VR system, such as a voicemail system, over an audio telephony connection.

In FIG. 1A, a first computer system is a VR system 104, which answers telephone calls, generates audio messages 106 and receives and acts upon a response 110 (DTMF or audio) from a caller. A voicemail system or a 411 information service are examples of VR system 104. A second computer system 102 makes calls to VR system 104 and uses a signal processing technique to recognize the audio signals (i.e., phrases) that are issued by VR system 104. Particularly when VR system 104 is a voicemail system, audio messages 106 are command prompts that require a specific response. System 102 sends response 110, either as voice-band audio or as tones, in response to command prompts from VR system 104, to establish control of the remote VR system. System 102 is controlled by a recognition program 108 specifically adapted to interact with VR system 104. The recognition program can instruct system 102 to call, interrogate, download, and manage a voicemail account residing at VR system 104, without human intervention. It should be understood that management of a voicemail account is not limited to merely retrieving messages, but encompasses normal voicemail management functionality, including message retrieval, message deletion, and message storage (e.g., storing messages as "new" messages).

Figure 1B:
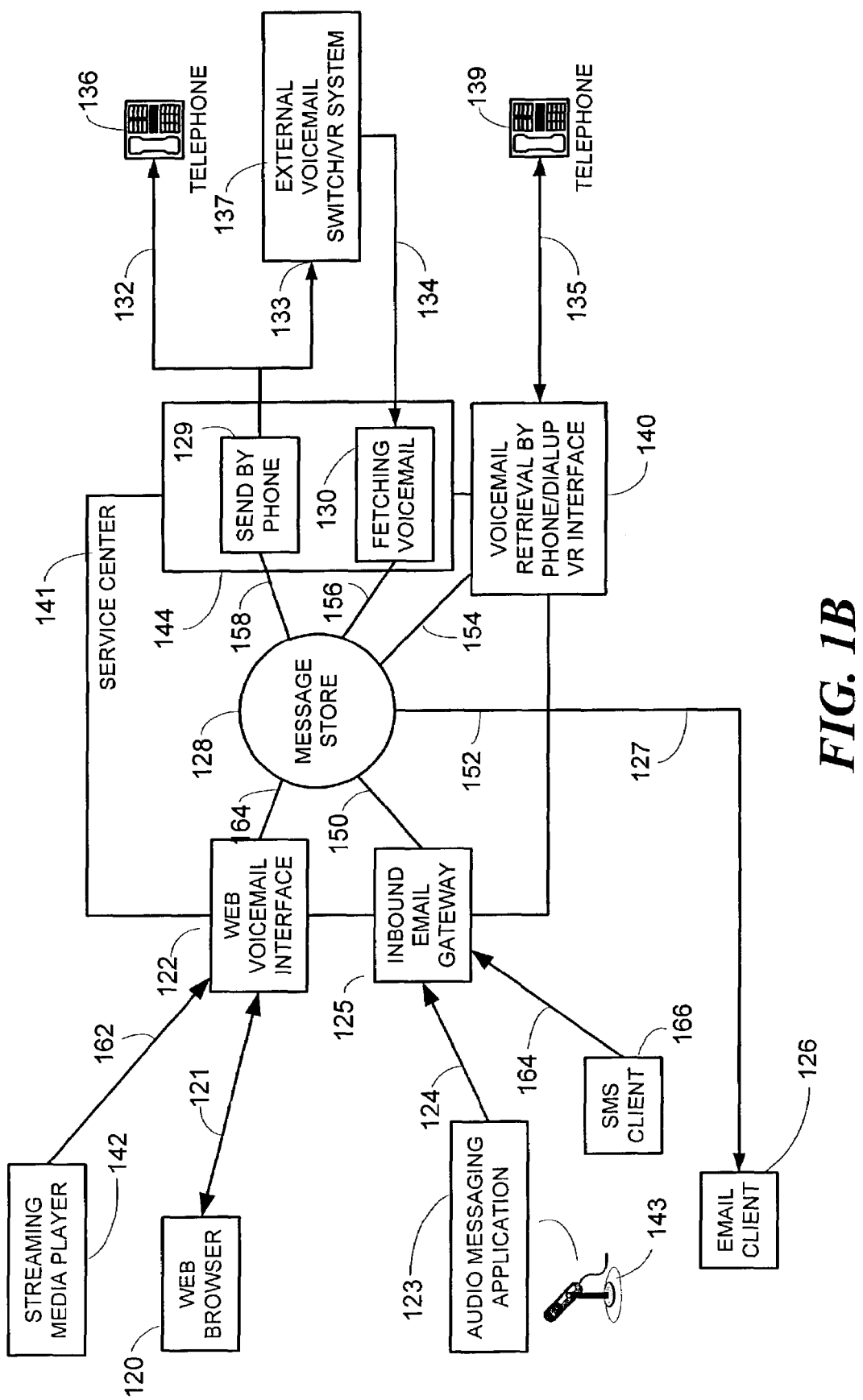
FIG. 1B is a schematic diagram showing an online service that employs the present invention.

FIG. 1B illustrates an Internet-based online service that utilizes the present invention in providing online access to voicemail messages. A service center 141 houses computers that interface with the outside world both over Internet connections 121, 124, 127, and 162, and over public switched telephone network (PSTN) connections 132, 133, 134 and 135. Note that logical connections 150, 152, 154, 156, 158 and 164 couple different elements of the service center 141 together. Typically such logical connections are implemented as network connections, coupling different computing devices together. Note that some functional elements of service center 141, such as Web Interface 122 and inbound email gateway 125 could be implemented as a single computing device A spooling computer system 144 provides a bridge between the Internet and the PSTN, over which messages can flow in both directions, based on the method described in conjunction with FIG. 1B. The service supports online access to the user's messages via a conventional Web browser application 120 (such as those executed on a PC, or a portable computing device), and/or a streaming media player 142. Users may also receive messages using an email application 126 via an Internet connection 127 or via a dialup VR interface 140 using a PSTN connection 135 and a standard telephone handset 139. In addition, new audio messages can be composed on a computer device equipped with a microphone 143 and an audio messenger application 123. These messages are sent via email to an inbound email gateway 125 using internet connection 124. From email gateway 125, the messages can be directed to one or more of a Message Store 128 of an existing user, a VR system 137 (i.e., a VR based voicemail system) that of the user (using a PSTN connection 133), or to a telephone 136 associated with the user (such as a cellular telephone, a mobile telephone, or a land line using a PSTN connection 132).

Figure 2:
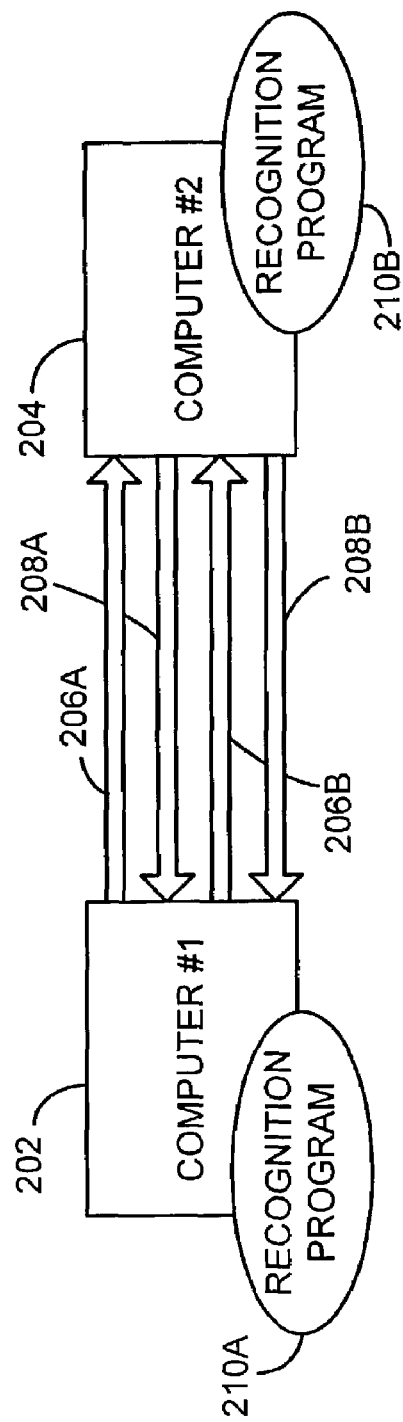
FIG. 2 is a schematic block diagram illustrating two computers that are using the present invention to communicate with each other over an audio communications channel.

FIG. 2 illustrates a second and related embodiment in which both computer systems 202 and 204 are capable of audio pattern recognition and audio response generation. In this case, these two computer systems can conduct an audio conversation with each other, in accord with their own individual recognition programs 210A and 210B. First computer system 202 sends audio messages 206A and 206B to computer system 204, which recognizes them and sends its own audio responses 208A and 208B to computer system 202. Both systems are controlled by respective programs 210A and 210B in accord with the present invention. The present invention, in its various embodiments, has applications in both civilian and military computer communications.

Exemplary Computing Environment

Figure 16:
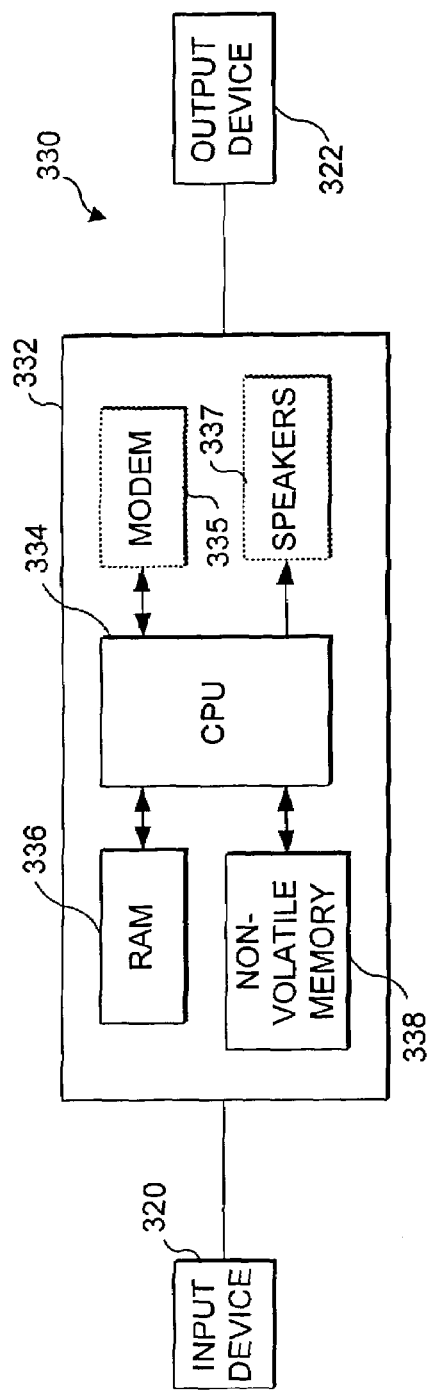
FIG. 16 is a block diagram of an exemplary computing device that can be used to implement the present invention.

FIG. 16, and the following related discussion, are intended to provide a brief, general description of a suitable computing environment for practicing the present invention. In a preferred embodiment of the present invention, an audio recognition application is executed on a PC. Those skilled in the art will appreciate that the present invention may be practiced with other computing devices, including a laptop and other portable computers, multiprocessor systems, networked computers, mainframe computers, hand-held computers, personal data assistants (PDAs), and on devices that include a processor, a memory, and a display. An exemplary computing system 330 that is suitable for implementing the present invention includes a processing unit 332 that is functionally coupled to an input device 320, and an output device 322, e.g., a display. Processing unit 332 includes a central processing unit (CPU) 334 that executes machine instructions comprising an audio recognition application (that in at least some embodiments includes voicemail retrieval functionality) and the machine instructions for implementing the additional functions that are described herein. Those of ordinary skill in the art will recognize that CPUs suitable for this purpose are available from Intel Corporation, AMD Corporation, Motorola Corporation, and other sources.

Also included in processing unit 332 are a random access memory (RAM) 336 and non-volatile memory 338, which typically includes read only memory (ROM) and some form of memory storage, such as a hard drive, optical drive, etc. These memory devices are bi-directionally coupled to CPU 334. Such storage devices are well known in the art. Machine instructions and data are temporarily loaded into RAM 336 from non-volatile memory 338. As will be described in more detail below, included among the stored data are data sets corresponding to known audio signals, and program scripts that are to be executed upon the identification of a specific audio signal. Also stored in memory are operating system software and ancillary software. While not separately shown, it should be understood that a power supply is required to provide the electrical power needed to energize computing system 330.

Preferably, computing system 330 includes a modem 335 and speakers 337. While these components are not strictly required in a functional computing system, their inclusion facilitates use of computing system 330 in connection with implementing many of the features of the present invention, and the present invention will generally require a modem (conventional, digital subscriber line (xDSL), or cable) or other form of interconnectivity to a network, such as the Internet. As shown, modem 335 and speakers 337 are components that are internal to processing unit 332; however, such units can be, and often are, provided as external peripheral devices.

Input device 320 can be any device or mechanism that enables input to the operating environment executed by the CPU. Such an input device(s) include, but are not limited to a mouse, keyboard, microphone, pointing device, or touchpad. Although, in a preferred embodiment, human interaction with input device 320 is necessary, it is contemplated that the present invention can be modified to receive input electronically, or in response to physical, molecular, or organic processes, or in response to interaction with an external system. Output device 322 generally includes any device that produces output information perceptible to a user, but will most typically comprise a monitor or computer display designed for human perception of output. However, it is contemplated that present invention can be modified so that the system's output is an electronic signal, or adapted to interact with mechanical, molecular, or organic processes, or external systems. Accordingly, the conventional computer keyboard and computer display of the preferred embodiments should be considered as exemplary, rather than as limiting in regard to the scope of the present invention.

Figure 3:
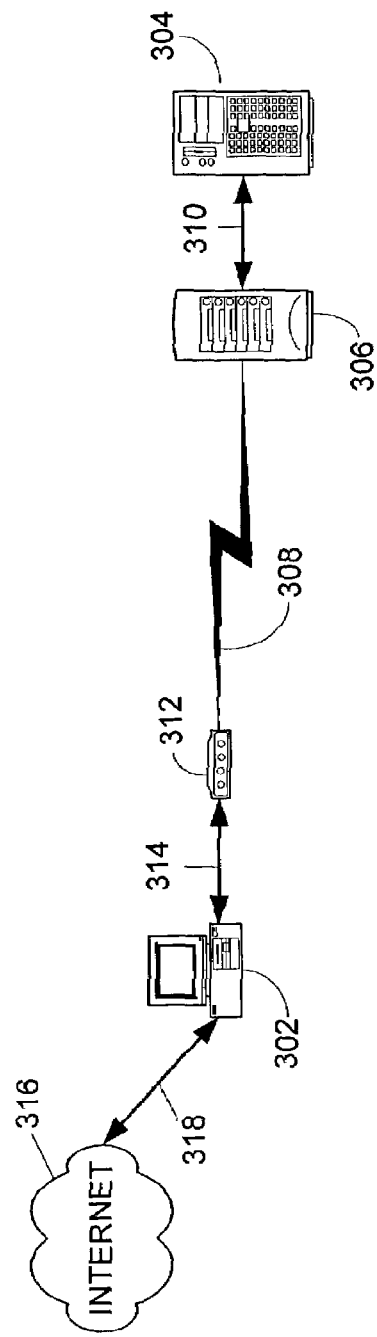
FIG. 3 is a schematic diagram of a computer connected to the Internet and using the present invention to communicate with a VR system located at a telephone company's central office, over the public telephone system.

In FIG. 3, a telephone communications path exists between a PC 302 (such as a PC disposed in a user's home or work place, or spooling computer system 144 of FIG. 1B), and a voicemail server 304 (likely disposed at a telephone company's facility). A first portion of the communications path is an analog telephone line 308 carrying an analog audio signal, which couples voicemail server 304 to a modem 312. A second portion of the communications path is a digital data cable 314 (such as a universal serial bus (USB) cable, a serial port cable, an IEEE 1394 data cable, a parallel port cable, or other suitable data cable) carrying a digital signal from modem 312 to PC 302. Thus, at PC 302, digitized incoming audio packets are available in real-time for use by applications running on PC 302. Furthermore, applications running on PC 302 can output digital audio signal via digital data cable 314 to modem 312, which then generates an analog audio signal to be transmitted over analog telephone line 308. Note that a modem, which enables the passage of digitized audio between it and the host computer system, is commonly referred to as a "voice modem."

At the telephone company, the telephone line terminates at a line card installed in a telephone switch 306. Digitized audio is then sent to and received from the line card and the voicemail server 304. Any DTMF sequences generated by modem 312 or PC 302 are recognized by switch 306 and passed as digital messages over a computer network 310 to voicemail server 304. In response to any commands encoded in the DTMF sequences, voicemail server 304 passes digitized audio messages to telephone switch 306, where the digitized audio messages are turned back into analog audio for delivery over the telephone line, back to the caller.

One preferred embodiment of the present invention is implemented in a software application that runs on PC 302. Hereafter, this application will be referred to as the "voice server." The voice server application makes calls over telephone voice circuits to voicemail server 304 to retrieve any voicemail for the user. Such a connection is made periodically (i.e., according to a predefined schedule), on demand, or both (as required or selectively initiated by a user). Once the connection is made, the audio (i.e., one or more spoken messages) output by voicemail server 304 is passed to the application running on PC 302. The voice server application compares the incoming audio with a dictionary of phrases it holds in encoded form. If a phrase is recognized, the calling computer executes a script that can take certain predefined actions, such as sending a command to the voicemail system as a DTMF command, or hanging up. In the preferred embodiment the calling computer executes a script that downloads and captures the user's voicemail from a voicemail switch. Once downloaded, each voicemail message is available as a compressed digital audio file in the popular MP3 format. This file can be sent by email or be otherwise distributed electronically via a data connection 318 to a network 316 such as the Internet. Message files can also be carried with the user by being stored in the memory of a personal device such as a PDA or mobile telephone. Preferably, the voice server application has a GUI that allows the user to easily fetch, review, manage, and manipulate his voicemail messages, as if they were email messages.

In addition to the voice server, a preferred implementation of the present invention includes two other elements; the "service," which is an Internet service built around the voice server, and the "audio messenger," which is an Internet client application.

The service portion of the preferred embodiment is schematically illustrated in FIG. 1B. The service enables multiple users to share access to a small number of voice servers comprising a spooling computer system 144. A service center 141 preferably includes a minimum of two computers. One computer, which in a preferred embodiment executes a Linux™ operating system, implements a message store 128, a Web Interface 122 (by which users are enabled to gain access to their messages), and a backend telephone voicemail retrieval system 140. In addition, the Linux™ operating system acts as an email gateway 125 for communicating with other applications, such as an email client 126, or an audio messaging application 123 (residing on computer a computing device). In the following discussion, a preferred embodiment of audio messaging application 123 is referred to as the audio messenger. One or more additional computers are attached to the telephone system via voice modems and are connected to the computer running the Linux™ operating system over a LAN (see spooling computer system 144). These computers implement the voice server functions of sending and retrieving voicemail messages over the telephone. Note that voice server 129 (sending function) and voice server 130 (retrieving function) can each be implemented on one or more individual computers, such that spooling computer system 144 includes one or more computers dedicated to the sending function, and one or more computers dedicated to the retrieving function. Of course, voice server 129 and voice server 130 can be implemented on a single computer, such that spooling computer system 144 is a single computer. Preferably, spooling computer system 144 executes a version of Microsoft Corporation Windows™ operating system. Those of ordinary skill in the art will recognize that the selection of a specific operating system is largely an element of preference, and that other operating systems, such as the Linux™ operating system, could be employed.

Figure 18:
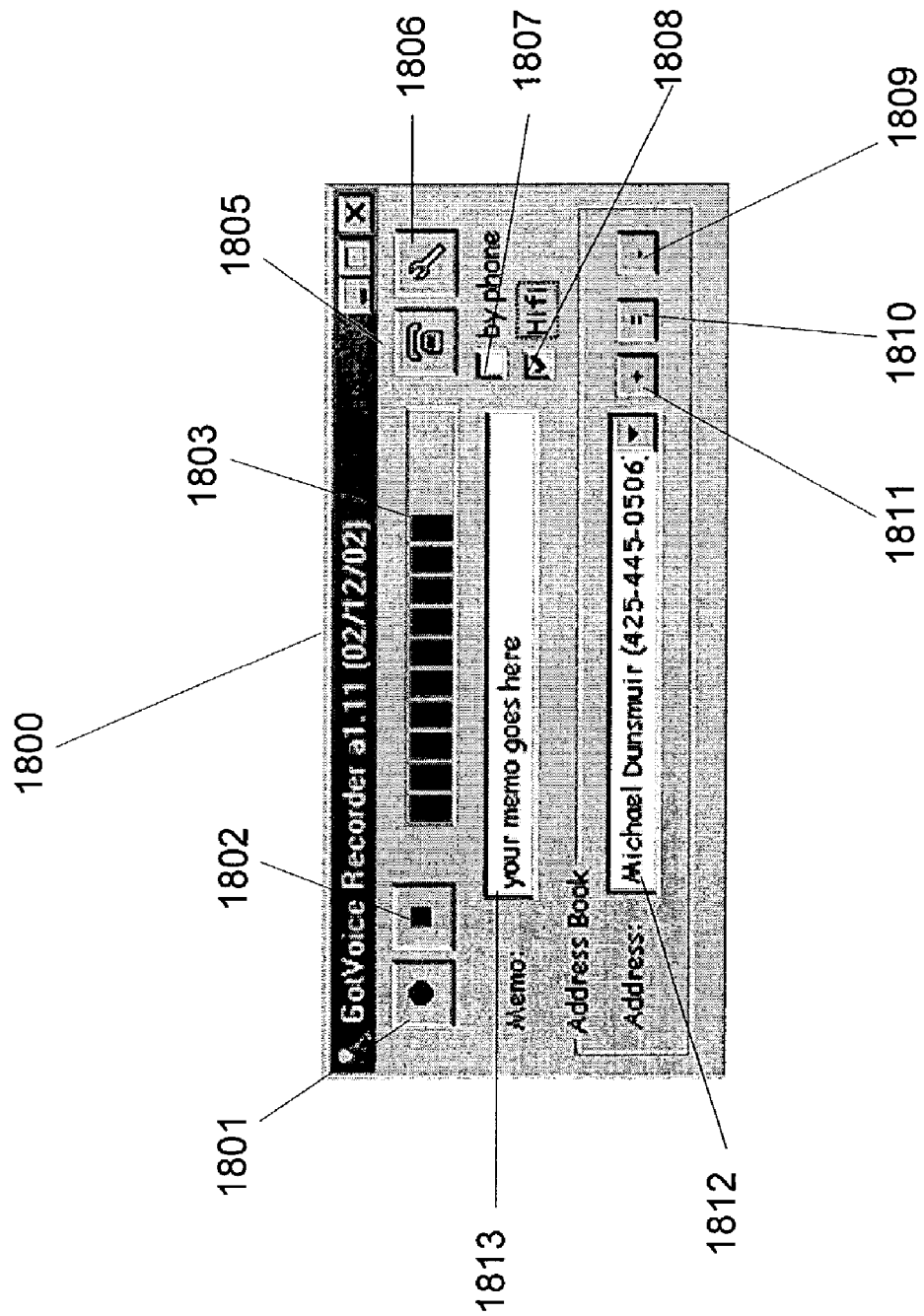
FIG. 18 illustrates an exemplary GUI of an audio messenger application employed in a preferred embodiment of the present invention.

The audio messenger portion in one preferred embodiment is shown in FIG. 1B, as audio messaging application 123 that is executed on the computing device. In an exemplary implementation of the present invention, the audio messenger is a small Windows™ application, which enables a user to record voice messages and send them directly into service 141 via email gateway 125. An exemplary implementation of the GUI of the audio messenger is illustrated in FIG. 18. The audio messenger application may be replaced with a third party application, as long as such third party application is properly configured to communicate with email gateway 125.

An exemplary voice server application has been implemented as a software application running on a general purpose computer equipped with a voice modem connected to an analog telephone line. The exemplary voice server application is written in the popular C++ programming language and is designed to be portable. A beta version currently runs under both Microsoft Corporation's Windows™ and the Linux™ operating system.

Structural Overview of a Preferred Embodiment of an Application

Figure 4:
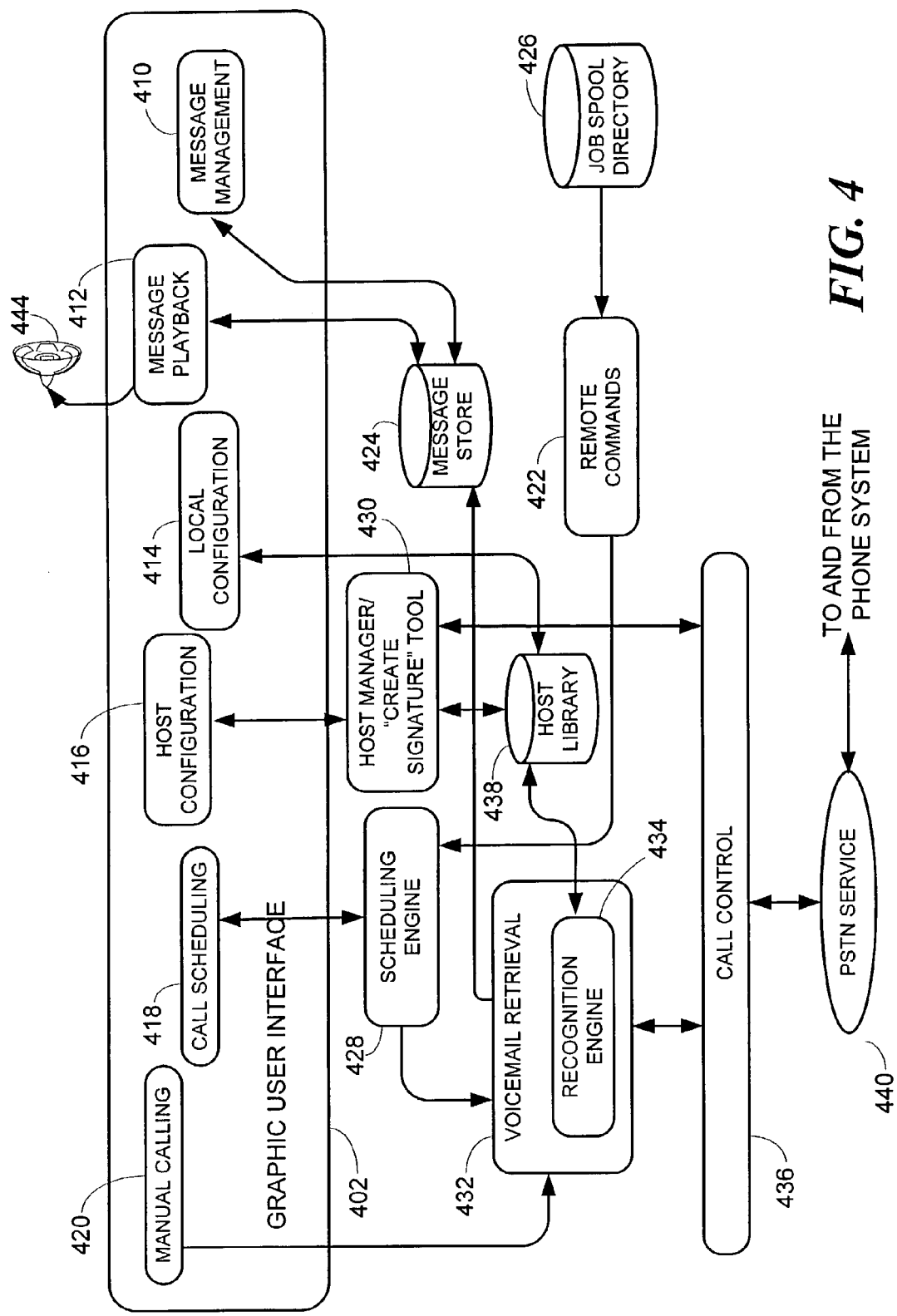
FIG. 4 is a schematic block diagram illustrating the overall structure of a preferred embodiment of the present invention.

FIG. 4 shows the overall structure of the preferred voice server application. The software runs on the PC and interfaces with the outside world through a GUI 402. A call control function 436 interfaces with a telephone service via a PSTN service interface 440. The underlying implementation of this interface is normally provided by the modem manufacturer. The voice server application also makes use of other TCP/IP network services, such as domain name system (DNS) resolution, which are implemented by the underlying operating system.

GUI 402 provides a user with functions to control and manage the application. FIG. 4 shows the major functions supported by the GUI. These are: message management 410; message playback, reply, and forwarding 412 (referred to hereafter simply as message playback 412); local application configuration 414; voicemail host configuration 416; call scheduling 418; and manual calling 420. Commands to the application can be executed through the GUI 402 or they can arrive as email messages containing remote commands. These commands are processed by a remote commands processor 422.

Remote commands processor 422 communicates with the outside world via a job spooling directory 426, into which command requests are placed by one or more other applications. In one preferred embodiment of the present invention, the service portion (described above in conjunction with FIG. 1B), uses spooling directory 426 and also accesses incoming messages, from within a message store 424. The remote command processor enables the voice server application to be controlled and configured remotely.

Other core functions within the voice server application, as shown in FIG. 4, include a scheduling engine 428, and a host manager 430. A voicemail retrieval function 432 uses call control function 436 to make, manage, and terminate telephone calls. Call control function 436 employs telephone PSTN service interface 440 to make telephone calls over the voice modem. The recognition of incoming audio is performed by a recognition engine 434, which utilizes a host library 438. The generation of the host library is described below. Messages may be heard utilizing a PC audio output, connected to a speaker 444.

Description of Main Software Loop

Figure 5:
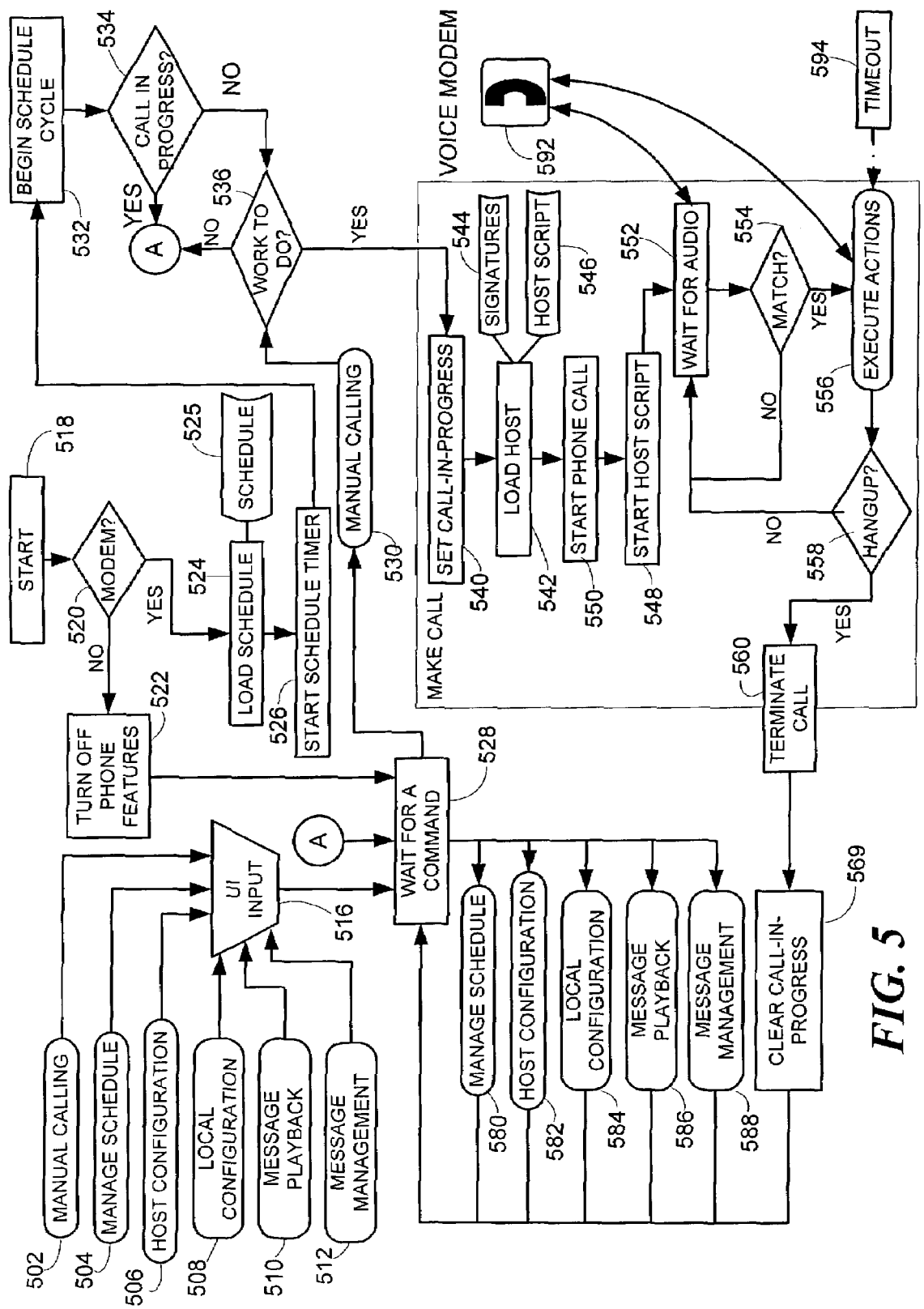
FIG. 5 is a schematic diagram illustrating the overall flow for the software employed in a preferred embodiment of the present invention.

FIG. 5 shows a flow diagram for the main software loop of the voice server application. When the program starts at a block 518, it first checks to see that a compatible voice modem is installed and operational in the host computer as indicated by a decision block 520. If there is no modem, the voice server software disables all functions within the software that require a modem, as indicated in a block 522. This step enables a subset of manual operations to be performed locally, and control passes directly to the main command loop at a block 528.

If a modem is present, the voice server software starts the call scheduler. This step involves loading a schedule in a block 524, which is retrieved from a file location, as indicated by a block 525. The voice server application starts a timer at a block 526. The timer causes a schedule cycle to be executed when a predefined interval expires (the timer value determines the granularity of scheduling), at a block 532. Typically the scheduler runs every few seconds, e.g., every 15 seconds.

Following the initiation of the schedule cycle, the software application waits for the schedule cycle or interval to expire, as indicated by the timer. Commands can be initiated either from a user interface (when the scheduled cycle is not running), or as a result of the scheduler choosing a remote command or local schedule entry to be executed. Blocks 502, 504, 506, 508, 510 and 512 correspond to user selectable commands, which can be received from the UI, as indicated by a block 516.

When the schedule cycle is running and after the timer interval has expired, the voice server application determines if a call is in progress, in a decision block 534. If it is, then the schedule cycle terminates, the timer is restarted, and control returns to the command loop, as indicated by block 528. If there is no call in progress, then in a block 536, the voice server application determines if there are any waiting jobs in the schedule cycle (i.e., any calls to start). If not, control again returns to the command at block 528.

If there is no call in progress and there are jobs in the schedule queue, a call is initiated. A first step in making a call is setting a call-in-progress indicator, as indicated in a block 540. Before the call is made, the voice server software loads the data required to communicate with the chosen host in a block 542. The host data includes a host script and a collection of signature files. Signature files each contain data used in the recognition of audio phrases by the remote VR system, and they are referenced by name from within the host script. For example, the signature defined in the file vwEnterPassword.sng is referenced in the host script as vwEnterPassword, the file extension being omitted. The host script contains a program script that instructs the voice server software what actions to take when a given signature phrase is recognized. The term host is used to refer to the combination of a host script, and associated signature files. Multiple hosts can share signature files, but they each have a unique host script file. Additional details relating to signature files, such as how they are generated and how the recognition of audio phrases using signature files is achieved, are provided below. Data corresponding to the host script are stored in a file location indicated by a block 546, while data associated with signature files are stored in a file location indicated by a block 544.

In any case, once the host data (script and signatures) have been loaded in block 542, the voice server application starts a telephone call using the modem, as indicated in block 550. Then the host script routine is initiated in a block 548. Once the connection is established, the voice server application waits for incoming audio to be received, as indicated by a block 552. The incoming audio is being received from a voice modem identified as a block 592. Once incoming audio signals are received, the voice server software enters a main recognition and action loop and begins processing incoming audio buffers as they arrive, as indicated in a block 554. A predefined timeout (indicated by a block 594) prevents the voice server software from being stuck in an infinite loop, which can occur in situations where the voice server software does not recognize any of the phrases in the audio signals that are received. Within the main recognition and action loop (i.e., in block 554), the voice server software continually processes these incoming audio packets. By default, these audio packets are received in an uncompressed pulse code modulation (PCM) format with 8000, 16-bit samples per second. Each sample represents the amplitude of the audio signal expressed as a signed 16-bit integer. Each incoming audio buffer contains N samples, where N is chosen to reflect the desired time resolution of the recognizer. Typically N is 2000, representing 250 ms of real-time. Each time an audio buffer is received, it is processed to create a signature data structure, and this real-time signature is compared with the signatures of the expected phrases, as specified in the host script that was earlier loaded. When a host script is loaded, all of the referenced signature files are also loaded. If the current audio buffer does not match a signature phrase, the voice server application waits for the next audio buffer to be received from the modem, as indicated by block 592. If the current audio buffer matches an expected phrase, the voice server program executes the actions that properly correspond to that phrase, in a block 556, where the required action is specified in the host script that was earlier loaded. In a preferred embodiment, the following actions are available:

1. Send a DTMF (Touchtone™) sequence over the telephone line to the voicemail host being called. These tones can either be generated via the modem or by the computer as audio played over the telephone line.
2. Start audio capture, and when instructed, stop capture and save the captured audio into message files.
3. Play audio files over voice-modem 292.
4. Record a progress or error message in the log file and/or on the computer console.
5. Terminate the call.

Once these actions have been executed in block 556, any timeouts are reset, and the voice server application determines if the call should be terminated in a block 558. The termination can occur as the result of a hang-up action, as the result of user intervention, or because of a default timeout expiring. Timeouts need not cause a call to terminate; instead, they can have actions of their own, which can result in continued processing, as if a phrase had been recognized. Under normal circumstances the call is terminated when all relevant voicemail messages have been retrieved following a dialog between the software and the remote voicemail server.

If a call is to be terminated, then control passes out of the main recognition loop, the telephone call is terminated in a block 560, and the voice modem device is closed. The call-in-progress flag is cleared in a block 569, and control returns to the main command loop, as indicated by block 528. As provided by this block, in the main command loop, the voice server application is waiting for a next schedule cycle to initiate a call (see block 540), or for a user input (see block 516).

Messages are captured and saved in message store 424 (shown in FIG. 4) during the execution of actions in block 556. The message capture and storage elements of block 556 are described in greater detail below.

Note that for each UI function indicated by blocks 502, 504, 506, 508, 510 and 512, there is a corresponding function within the command loop, as indicated by blocks 530, 580, 582, 584, 586 and 588.

Note that manual calling is the function of initiating the call, under user control, from a menu, rather than having the call initiated by the scheduler. The user selects manual calling from a menu, enters the telephone number to call, and selects the script to be used (from a menu list of available scripts).

Detailed Description of Main Recognition and Action Loop

Figure 6:
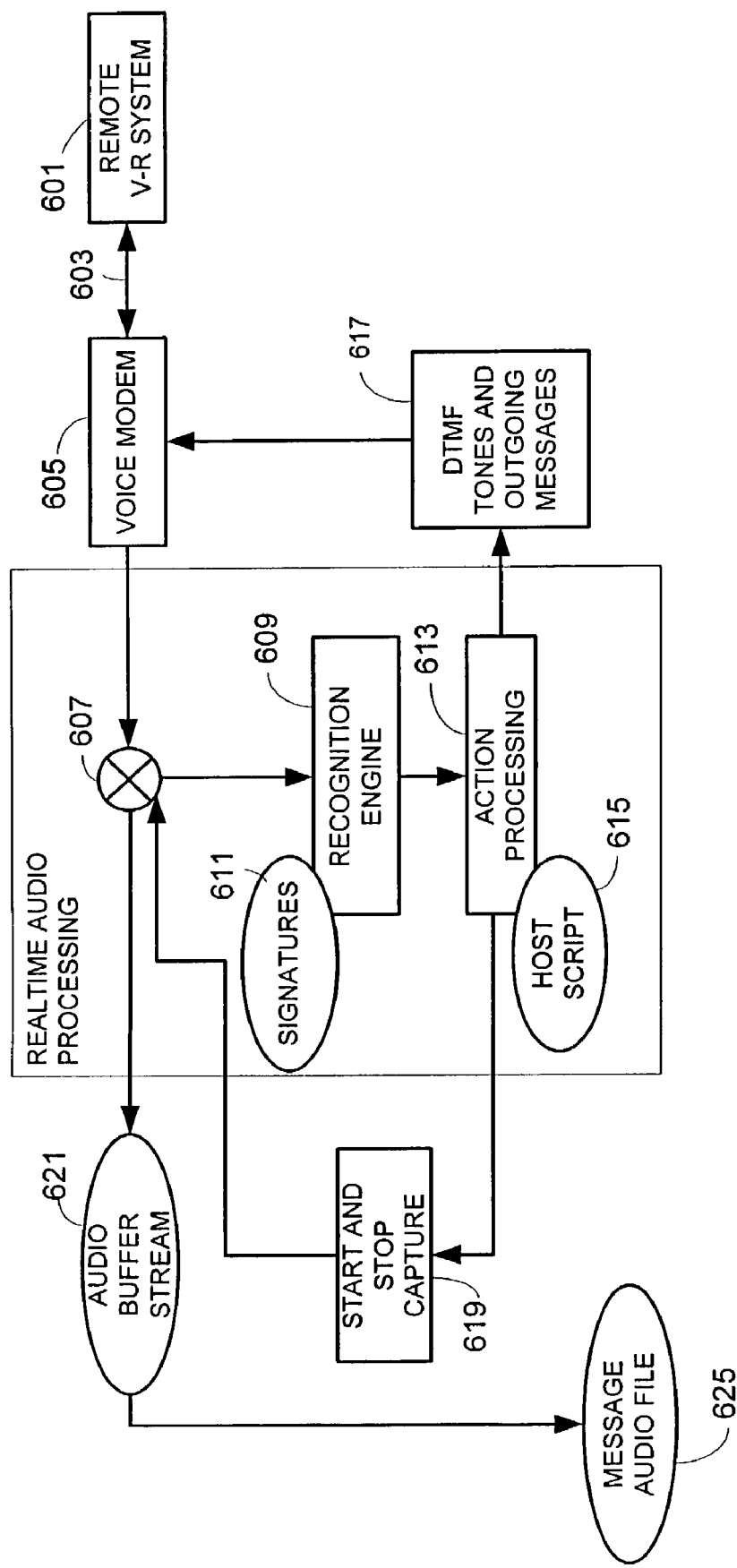
FIG. 6 is a schematic block diagram showing the main recognition and action loop of the software implemented in a preferred embodiment of the present invention.

FIG. 6 shows a schematic diagram of the main recognition and action loop of the program (more generally indicated by block 528 in FIG. 5). The voice server software calls a remote voicemail system 601 (i.e., a VR based voicemail system) over a PSTN line 603 using a voice modem 605. Each incoming audio packet is processed as indicated by process block 607 and compared with a number of signatures, each representing a possible audio phrase to be recognized. The comparison is performed by a recognition engine 609, using stored signatures 611. Recognition engine 609 of FIG. 6 is the same as recognition engine 434 in FIG. 4.

If a signature is recognized, then the actions associated with the recognized phrase in host script 615 are executed in a block 613. These actions include sending a DTMF tone 617 over voice-modem 605 to the remote host 601, and starting and stopping audio capture.

In the case of audio capture commands, the actions control whether the incoming audio indicated by block 621 is to be routed to a message audio file 625. The incoming audio is analyzed by process block 607. Audio not part of a message is discarded.

The phrases that are to be recognized are determined by the host script being executed. An example of part of a host script is shown in Table 1.

TABLE 1

```
:getmessage 60
    expect vwEndOfMessage
        message End_Of_Message
        save i
        send 9
    expect vwNextMessage
        message Message_Saved
        capture 1000
    expect vwEndOfMessages
        message End_Of_Messages
        hangup
```

In the above example, a label (:getmessage) is associated with three expect clauses, and a timeout value of 60 s (i.e., if nothing happens in 60 seconds, the voice server application terminates the connection). Each expect clause instructs the program to compare the signatures of incoming audio packets with the signature for an existing phrase (i.e., the signatures vwEndOfMessage, vwNextMessage, and vwEndOfMessages). There can be multiple parallel expect clauses, as shown in the above example. In this case, the incoming audio is compared with three identified possible phrases. If one of the phrases is recognized, the actions associated with the expect clauses are executed.

In this example, if vwEndOfMessage is recognized by the voice server software then a status message "End Of Message" is output, the message is saved in the Inbox of the message store 424 (see FIG. 4), and a "9" DTMF code (or whatever DTMF code that particular VR system requires to save a message) is sent to the remote VR system to also save the message in its predefined storage.

If vwNextMessage is recognized (signifying the start of a new message), the message "Message Saved" is output, and the capture of the new message begins. The parameter 1000 on the "capture" statement indicates that the first 1000 ms of audio should be trimmed from the message (for cosmetic reasons). If vwEndOfMessages is recognized (indicating the end of the last message), the voice server software terminates the call.

Figure 15:
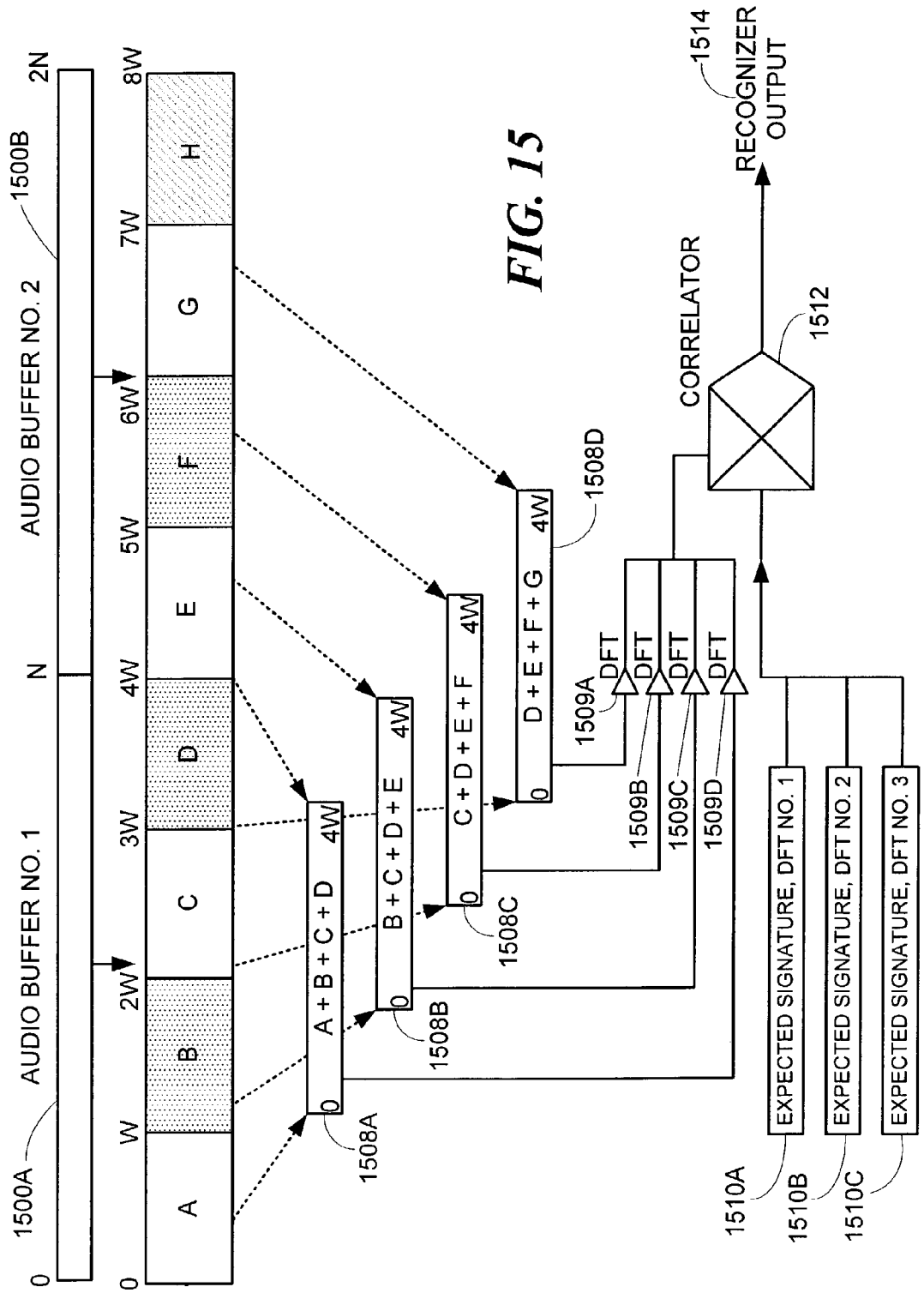
FIG. 15 is a schematic diagram showing the manner in which incoming audio is compared to stored signatures during phrase recognition.

FIG. 15 provides details of how the recognition of incoming audio phrases proceed. Recognition does not begin until two audio buffers have been captured from the voice modem. Audio buffers 1500A and 1500B are each N samples in length. At each cycle of the recognition loop (indicated by block 554 of FIG. 5), the N samples comprising the last audio sample and the current (most recently arrived) audio sample are processed by iterating through a series of sample windows, of width N samples, starting at positions 0, W, 2W and 3W, where W is an exact fraction of N (in our example, it is assumed that W=N/4). At each iteration, the start of the sample buffer is advanced W samples.

Use of this sliding window arrangement to derive successive input audio buffers is intended to compensate for the fact that the voice server application does not know where the real-time audio starts relative to the start of the recorded signature that is being compared with it. By ensuring that successive buffers overlap with each other, the discrimination of the recognition is improved, and the possibility for signatures to go unrecognized is reduced. This aspect of the invention is further discussed below, in the relation to signature creation.

In the example of FIG. 15, there are four window sample buffers 1508A-1508D. Note that buffers 1508A-1508D include audio amplitude data corresponding to buffers 1500A and 1500B, which have been separated into buffer chunks A-H. Window sample buffer 1508A includes buffer chunks A, B, C, and D; window sample buffer 1508B includes buffer chunks B, C, D, and E; window sample buffer 1508C includes buffer chunks C, D, E, and F; and window sample buffer 1508D includes buffer chunks D, E, F, and G. Buffer chunk H forms the last buffer chunk of the first sample window when buffer 1500B becomes the buffer corresponding to 1500A, and buffer 1500B is replaced with a new buffer (i.e., on the next cycle of the main recognition loop (block 554 in FIG. 5.)

The audio amplitude data in each window sample buffer (i.e., buffers 1508A-1508D) are processed to create a corresponding DFT of itself, thereby producing DFTs 1509A-1509D. The generation of such DFTs is well-known to those of ordinary skill in this art. Each DFT represents the spectral characteristics of the audio data. Each data item in the DFT represents the normalized power present at a particular audio frequency. For an audio dataset of N samples, the DFT consists of N/2 values. For each of these values i, where i ranges from 1 to N/2, the value represents the power present at the frequency i. If the original N audio samples represent T seconds of real-time, then the real frequencies represented by the DFT are in the range of $1/T <= f <= N/2T$. For example, if N is 2000 and T is ¼ second, then the range of the audio frequencies represented by the DFT is $4 Hz <= f <= 4 KHz$.

For the four DFTs created (i.e., DFTs 1509A-1509D), each is compared with pre-computed DFT buffers (DFTs 1510A-1510C are three such DFT buffers), which are the signatures of the audio phrases to be recognized. A correlation function 1512 is applied to each pre-computed DFT (i.e., DFTs 1510A-1510C) and each sample DFT (i.e., DFTs 1509A-1509D) in turn, and if the correlation reaches a predetermined threshold, the phrase represented by one of the signatures 1510A-1510C is deemed to have been recognized, and this recognition is output at a block 1514. Correlation functions for comparing normalized data are well-known in the field of signal processing. The creation of signatures and the setting of correlation thresholds is a function of the learning process, which is described below.

Preferably, buffers 1500A and 1500B (the recognition buffers) each include ¼ second of audio data. Thus, buffer chunks A-H each include 1/16 second of audio data. Four buffer chunks combined include ¼ second of audio data. As described in conjunction with FIG. 10, the best DFTs used for the signature (i.e., signature DFTs 1510A-1510C) are preferably based on ¼ second of audio data. It should be understood that DFTs could be generated based on different lengths of audio data, as long as the DFTs in the signature file and the DFTs generated from incoming audio, as described in FIG. 15, are based on the samples of comparable size. Empirical data indicate that samples of ¼ second provide good results.

As described above, once a phrase is recognized, the actions associated with its expect clause are executed, as defined in the current host script. The host script typically contains multiple labels, each associated with one or more expect clauses and actions. One of the results of recognition, therefore, can be the transfer of control from one label to another in the state table program. This transfer of control is performed via the "goto" statement. Table 2, which follows, shows examples of the "goto" statement in host scripts.

In the example of Table 2 there are three labels: ":start," ":password," and ":preamble." Control starts at the label ":start," and the program waits for the remote voicemail system to say, "Please enter your telephone number." This action triggers the expect clause for the signature "nxEnterPhoneNumber," at which point, the script sends the telephone number (followed by an *) to the remote VR system as a sequence of DTMF tones "send &n,*". A "goto" statement is then used to pass control to the label ":password". The ":password" label expects to hear "Please enter your password" (nxEnterPassword) within 20 seconds. If it does not, the program executes the timeout clause and terminates the call with an error report "E_Number_Rejected".

If the password request arrives in time, the expect clause associated with "nxEnterPassword" is executed. The password is sent as a sequence of DTMF tones, and control passes via another "goto" statement, to the label ":preamble," where message processing begins.

TABLE 2

:start 30
    expect nxEnterPhoneNumber
        message Sending_Phone_Number
        send &n,*
        goto password
//
:password 20

TABLE 2-continued

```
        expect nxEnterPassword
            message Sending_Password
            send &p
            goto preamble
        timeout
            message E_Number_Rejected
            hangup
//
:preamble 20
        expect nxToPlayYourMessages
            send 1
            ....
```

Handling Multiple Simultaneous Signatures

The host scripts shown in Tables 1 and 2 are simple examples. In practice it is often necessary to have multiple expect clauses under the same label. Table 3 illustrates the use of multiple expect clauses.

TABLE 3

```
:howmany
    expect NoMessages
        message You_Have_No_Messages
        hangup
    expect OneMessage
        message You_Have_One_Message
        hangup
    expect MultipleMessages
        message You_Have_Multiple_Messages
        hangup
```

In the example of Table 3, there are three expect clauses associated with the label ":howmany." When the voice server is executing this script at the label ":howmany," it compares the incoming audio with all three signatures. If the audio matches one of these signatures, then the corresponding expect clause is executed. The script in this example can therefore distinguish between no messages, one message, and multiple messages, and in response, displays the appropriate text "You_Have_No_Messages," "You_Have_One-_Message," etc. to the operator.

The Complete Processing Cycle

Figure 7:
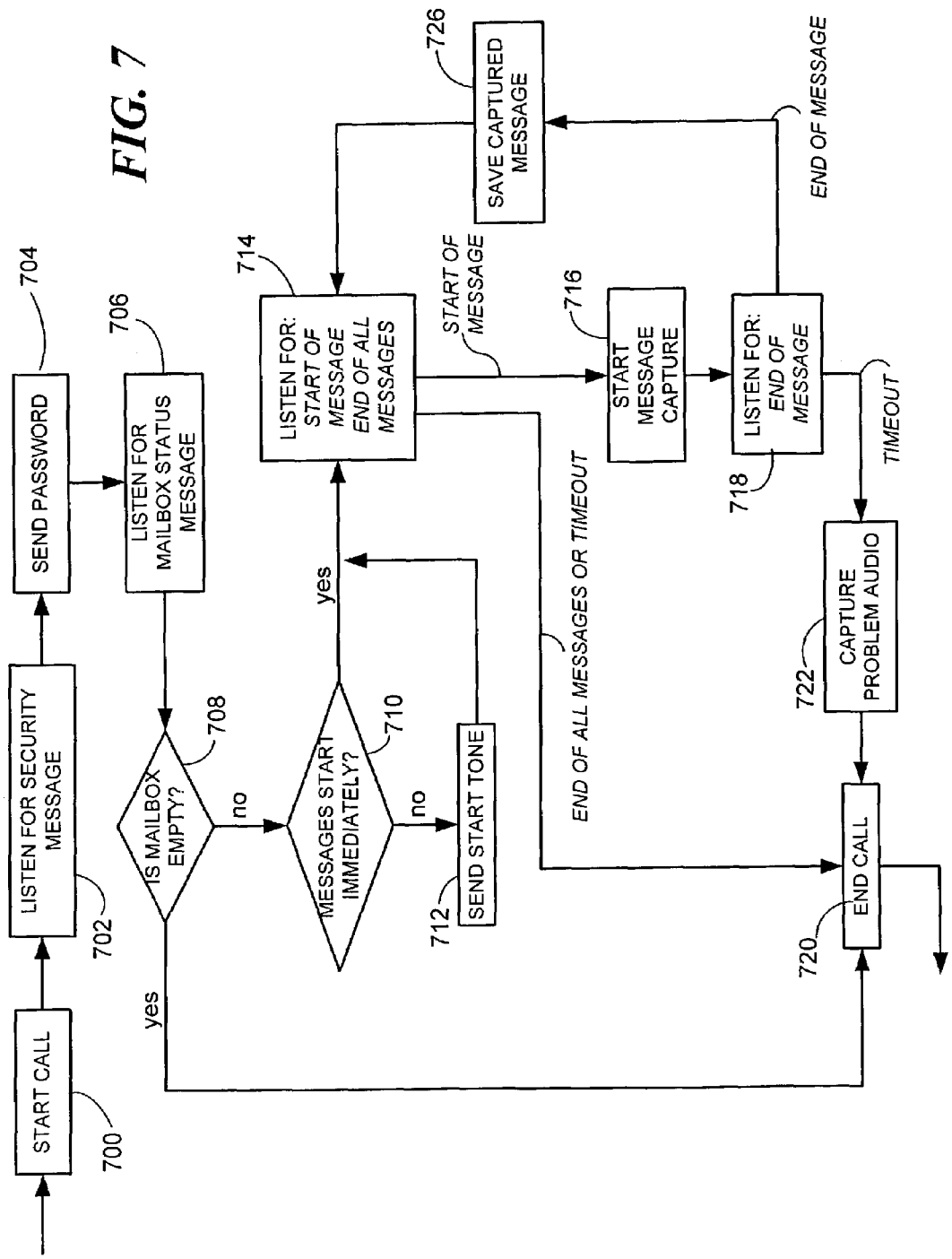
FIG. 7 is a flowchart illustrating the logic for the processing and display of newly arrived voicemail messages in a preferred embodiment of the present invention.

FIG. 7 shows a flowchart detailing the processing of a call from the voice server application to a remote telephone voicemail system. Once the call has been started in a block 700 and audio processing has begun, the voice service software completes logging in to the remote voicemail system by identifying a security message in a block 702, and responding with the proper password in a block 704. In a block 706, the voice server application processes and identifies the mail box status message, and in a decision block 708, the voice server determines if the mail box is empty. If there are no messages to retrieve, then the call is terminated in a block 720. Otherwise, message playback begins. Note that in some cases, a first message begins immediately following login, and in some cases, a DTMF tone sequence must be sent to begin message playback. Thus, in a decision block 710, the voice server application determines if message playback is to begin immediately. If not, then in a block 712, the correct DTMF tone sequence is sent to begin message playback. In any case, in a block 714, the voice server application waits for any of: a timeout; a "Start of Message" indication; or an "End of All Messages" indication (indicating the last message has been captured).

If a timeout occurs, then the call is terminated in block 720, as indicated above. If receipt of a "Start of Message" indicator occurs, message capture begins in a block 716, until the voice server application program identifies an end-of-messages indicator or a timeout, as indicated in block 718. If a timeout occurs, the audio is captured for later review in a block 722, and the call is terminated in block 720. If an "End of Message" indicator is recognized, then the audio that has arrived since the capture was initiated is saved to a message file in a block 726. At that point, the logic loops back to block 714 to await an additional message, a timeout, or an end of message indicator, as described above. Multiple messages are captured in this way, until an "End of All Messages" indicator or timeout is received, in which case the call is terminated in block 720, as previously described. In a preferred embodiment, the captured audio messages are encoded in the popular MPEG-1, level 3 (MP3) format.

Method of Creating Keys for Message Files

One of the problems with voicemail retrieval is that it is often desirable to keep existing messages within the VR system for extended periods. If a message remains in the user's voicemail box, however, it will be repeatedly downloaded by the software and the user will be confused by multiple copies of the same message. The invention provides a method for recognizing messages that have already been seen. Duplicate messages can then be discarded, hidden from view, or otherwise disposed of.

Each message file, as it is processed, has a key built for it. The key is a short sequence of numbers, saved in a key file associated with the message. This key is based on a compact encoding of the audio spectrum (DFT) of the message. This key can be compared with the keys of other messages using a correlation function. If the keys of the messages correlate, it is assumed that the two messages are identical. By choosing the length of the encoding window to be large with respect to the word length used in the messages (e.g., greater than two seconds), the correlation of messages with differing audio heads and tails (resulting from timing variations during calls to the VR system), but similar bodies, remains high. Because message keys are short (typically 100 bytes or less), the key for a new message can be correlated with a very large number of messages in a short time. A preferred key is the audio spectrum of the whole message, divided into 20 segments. The resulting 20 values, plus the message length and the message position (in the external voicemail box), are stored as American Standard Code for Information Interchange (ASCII) text in a key file.

Figure 8:
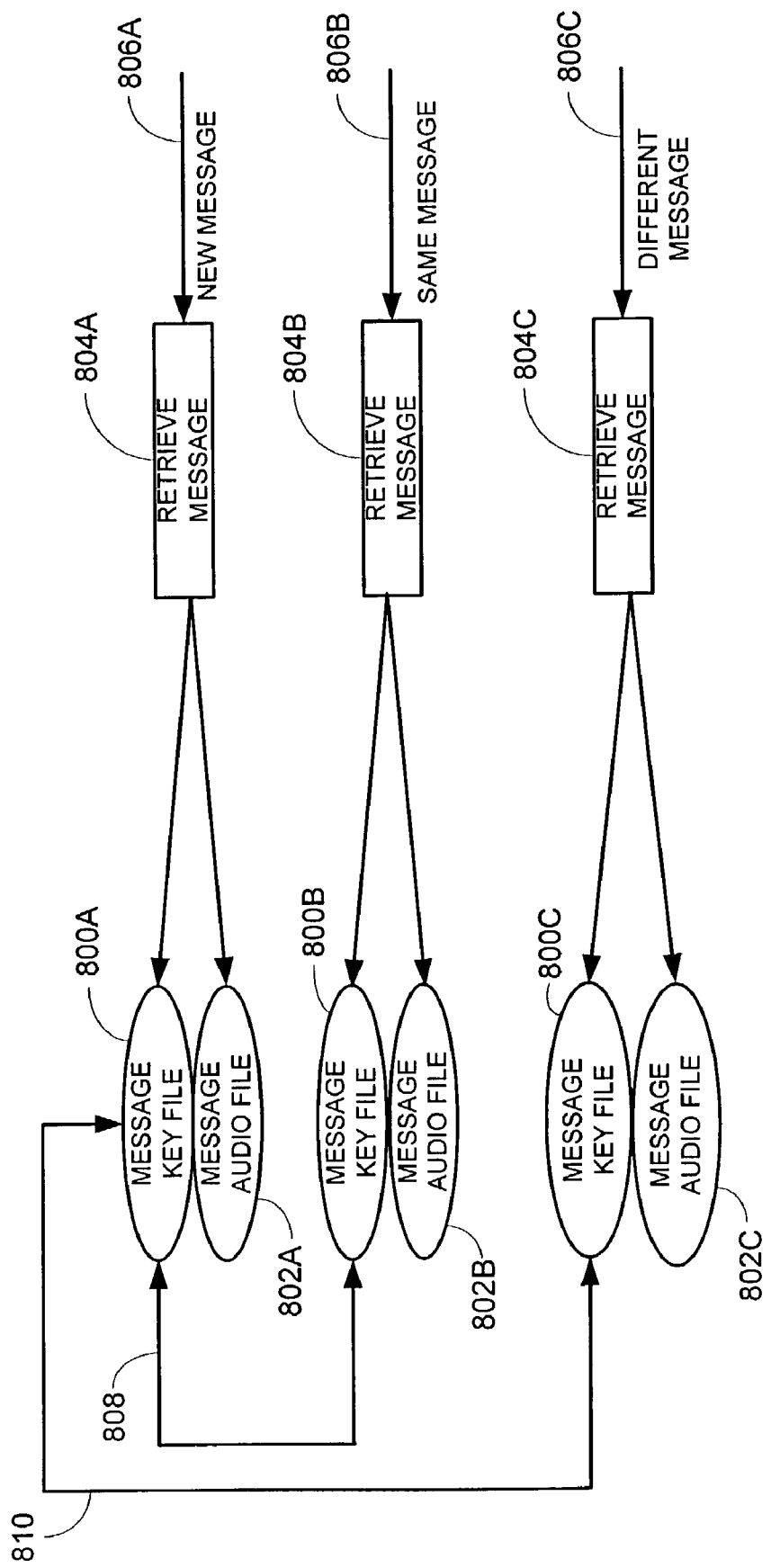
FIG. 8 is a schematic block diagram showing the manner in which message keys (generated for voicemail messages on arrival) are used to identify the same message if it is retrieved again.

FIG. 8 schematically illustrates how message keys are used to recognize similar messages and distinguish dissimilar messages. A new message indicated by an arrow 806A is retrieved by the voice server application in a block 804A. The voice server application processes the message to create a message key file 800A and a message audio file 802A. At some later time, the same message, as indicated by arrow 806B, is retrieved again in a block 804B. Once again, message key 800B and message audio file 802B are created. After message key 800B is created, the voice server application compares message key 800B with all other stored message keys. If a match is found, as is indicated by line 808 connecting message key 800A and 800B, the voice server application knows that message audio files 802A and 802B are for the same message. Message key 800B and message audio file 802B (or message key 800A and message audio file 802A) can be safely deleted, if desired. Now a third message (indicated by arrow 806C), different from the other two, is retrieved at a block 804C. A message key 800C and message audio file 802C are generated. Message key 800C is compared with all previous messages (including 802A and 802B, if both have been saved). In this case, the keys do not match, as indicated by line 810, and the message is considered distinct (i.e., not the same as any other message previously received).

How New Phrases Are Learned by the Voice Server Software

In the above description of the voice server application implemented in one preferred embodiment, the recognition engine (corresponding to recognition engine 434 in FIG. 4 and recognition engine 609 in FIG. 6) uses signatures 611 (shown in FIG. 6) to recognize phrases in incoming audio. FIG. 15 schematically illustrates, and the above discussion explains, the method by which these signatures are compared with the incoming audio. Before a phrase can be recognized by the software, however, it is necessary for the software to be taught to recognize that phrase and to prepare a signature for it.

Figure 9:
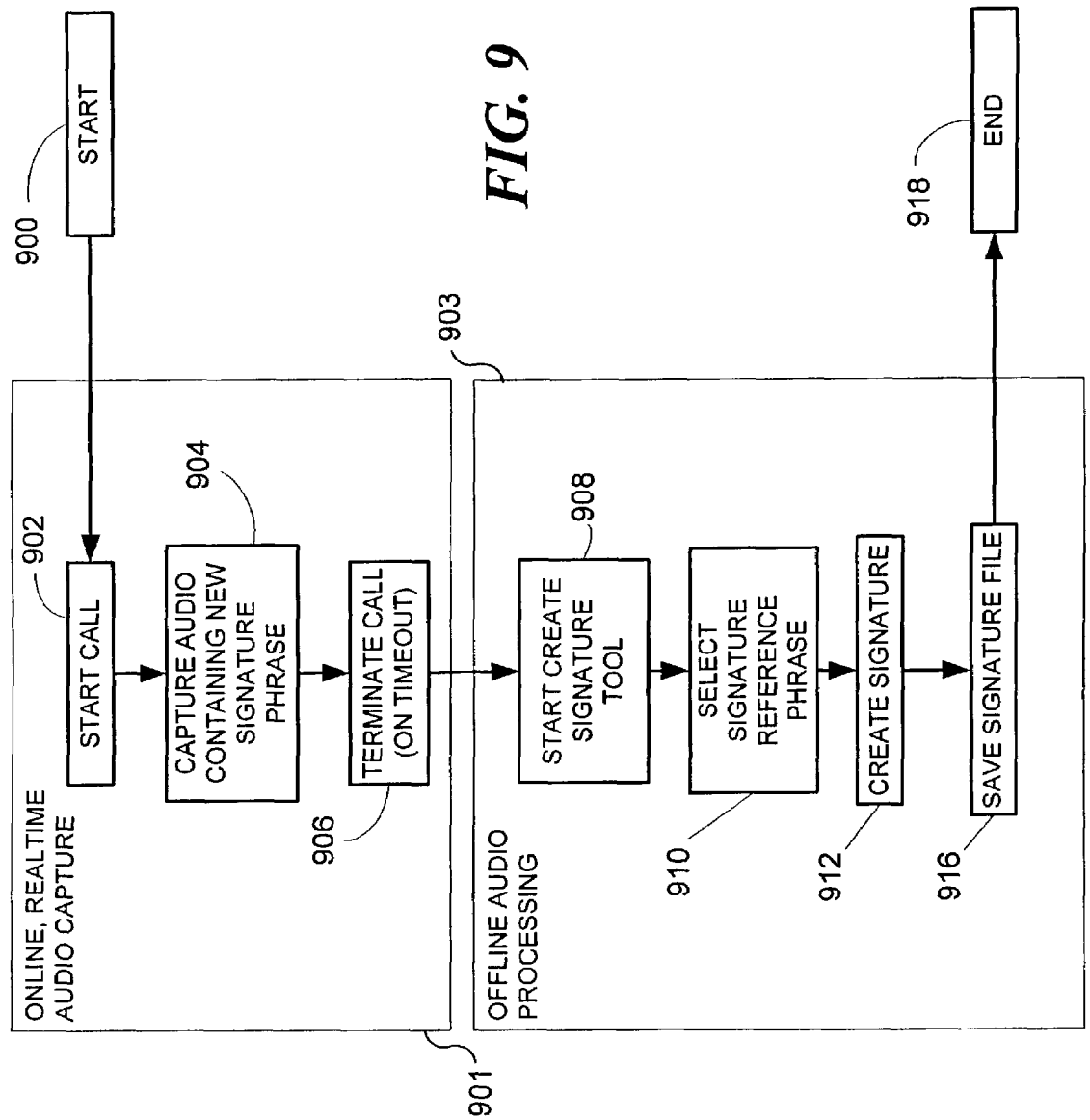
FIG. 9 is a flowchart showing the steps used for configuring the software employed in the present invention to recognize a new audio phrase.

Thus, before a signature (e.g., vwEnterPassword) can be used in a host script it must be learned by the voice server software. FIG. 9 illustrates the steps involved in teaching the voice server software to recognize a new phrase. In the terminology used herein to describe the voice server application, a phrase represents the audio sequence to be turned into a signature. For example, the signature vwEnterPassword might be associated with a phrase containing the audio "Please Enter your Password."

The basic steps in creating a new signature file are as follows.

Make a call using a host script and capture the audio containing the new phrase to be learned.

Use the signature creation tool (shown in FIG. 12 and described in detail below) to examine the captured audio sequence offline, to choose the new phrase to be recognized and make a signature for it.

Save the signature to a file. Preferably, by convention, signature files are named with a two letter prefix, signifying the host and a name spelling or identifying the corresponding phrase. Thus, the name "vwEnterPassword," includes "vw" to identify the host (in this case Verizon Wireless™) and "EnterPassword" to identify the phrase.

Edit the host script to include the use of the new signature and make a test call using it.

Each of the high level steps used to create a new signature file are shown in FIG. 9. In this Figure, boxes 901 and 903 respectively separate the steps into online and offline groups. A block 900 indicates a start of the sequence of steps, while a block 918 indicates an end of the sequence of steps. The first step is to make a call to the remote VR system (i.e., to the host) whose phrase is to be learned, as indicated by a block 902. This call is made with a partial script that enables the voice service application to navigate the remote VR system to the point where the host speaks the phrase to be recognized. At this point, the voice service application captures the audio signal, as indicated by a block 904. If a capture command has been executed (as described above), but the call ends before a save command has been issued, the software saves all of the audio after the capture command in a message for diagnostic purposes. Therefore, scripts used for learning purposes usually contain a capture command, just before the new phrase is likely to be issued. Because the script generally cannot yet identify the new phrase, a timeout normally occurs after the capture of the new phrase, to end the call, as noted in a block 906. The captured audio is saved as a normal voicemail message within the voice server message store.

The GUI of the voice server software preferably enables any message to be selected as containing the audio for a new signature. In most error or unexpected phrase situations, the scripts will capture trailing audio automatically, and therefore, it is rarely necessary to make extra calls to capture new phrases to be recognized, except when building the basic scripts for a host for the first time.

Phrase Selection and Signature Creation

Once the audio containing the phrase to be learned has been captured in a message, a user selects the create signature tool from the GUI in a block 908. In one preferred embodiment, when using the create signature tool, only one message (corresponding the next phrase to be recognized) is processed at a time. The message presented to the operator will be the last message captured by the voice server (see block 906 of FIG. 9). When the create signature tool is launched, the last message will be used as the audio source. The users utilize the create signature tool to select a signature reference phrase in a block 910, as will be discussed in greater detail below. In a block 912, the create signature tool generates the signature by applying a DFT to the audio. In a block 916, the DFT is saved. Thus, each signature file contains the DFT of the phrase audio. Signature creation is described in greater detail below. As already described, this DFT is compared with incoming audio within the recognition engine of the voice server application. Once the DFT has been checked manually and any parameters adjusted (see below), it is saved to a signature file, and the new phrase may now be used in a host script.

In creating a script from scratch, the process illustrated in FIG. 9 is repeated until all the phrases used by a specific host have been learned, and the script for that host is completed. In most situations, only five or six phrases occur in the dialog with a particular host. Therefore, creating support for a completely new host is a relatively simple and quick process.

Methodology of Phrase Selection

In most cases, the selection of the phrase to be recognized is straightforward. As will be described in detail below, one preferred embodiment uses signatures that represent a ¼ second portion of the audio file. Therefore, each phrase is best recognized by that ¼ second portion of audio that is unique to that phrase (unique in the context of recognizing that phrase from other phrases). At any given time during a call, the "recognition context" is the set of all possible messages that may be heard. For example, in a typical situation during a mail box login, the context is very simple, likely consisting of a phrase similar to "please enter your password," and a timeout error message such as "press the star key for more options." In such a recognition context, the present invention requires the generation of a signature to enable the phrase "please enter your password" to be recognized. It is likely that this phrase will be repeated a plurality of times without interruption, before the error message is played. Because this recognition context is simple, any ¼ second portion of the phrase "please enter your password" will yield a signature that is readily distinguished over another signature, such as that produced by any ¼ second portion of the phrase "press the star key for more options."

Table 3 (above) provided a more complex example in which portions of three messages were very similar. Similar messages will likely be encountered when navigating through a menu of a voicemail system. The three messages include: "You have no messages," "you have one message," and "you have <N> messages" (where N is any number corresponding to the number of messages received). Because these messages have parts in common, the portion of the message to create a signature (i.e., the reference phrase) must be carefully selected. The phrases "you have no messages" and "you have one message" never vary, while the phrase "you have <N> messages" (where N is any number) includes the variable N. The following procedure can be used to select a portion of a message to enable that message to be distinguished from similar messages.

1. Recognize that the identical portions of similar messages (i.e., "you have") cannot be selected for generating signatures that will distinguish similar messages. The selected portion must be based on the non-identical portions of the messages (in the instant example, the selected portion that can be used includes "no messages," "one message," and "<N> messages."
2. When possible, select distinguishable and non varying portions of the phrases. In the instant example, the phrases "you have no messages" and "you have one message" can be distinguished by producing a signature based on the word "no" for the former phrase, and the word "one" for the latter phrase.
3. For remaining messages or phrases, select a portion of the remaining phrase that is shared in common with similar phrases, such that the portion in common occurs later in other phrases than their signature portion. Note in the present example the words "no" and "one" occur before the word "message." Thus the word "messages" can be used to generate a signature for the phrase "you have <N> messages", because recognition of the phrase "you have no messages" occurs at "no", and recognition of the phrase "you have one message" occurs at "one".

The operation of the create signature tool (a function of the voice server that is used to select reference phrases and to create new signatures based on the reference phrases) is discussed in detail below.

Details of Signature Creation

Figure 12:
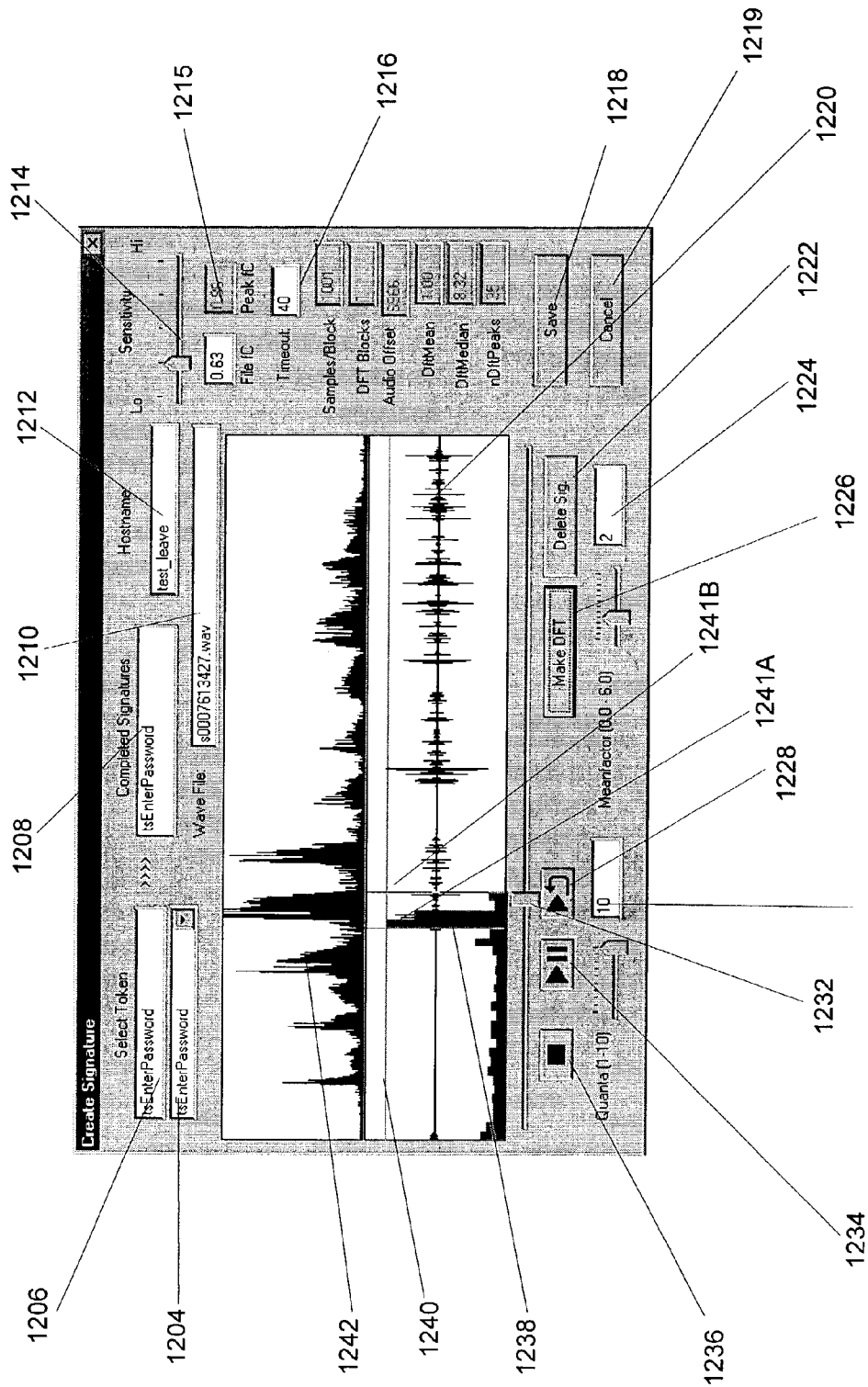
FIG. 12 is a screenshot of the portion of the graphical user interface (GUI) used in a preferred embodiment of the present invention, to allow the user to adjust new phrases during the creation of signature files.

FIG. 12 shows an exemplary embodiment of the GUI of the create signature tool. It is a typical Windows™ dialog box. As indicated above, this tool is invoked at block 908 of FIG. 9, and the last audio file collected will be provided to the create signature tool. The name of the audio file being manipulated to produce a signature is displayed in a text field 1210, while a name selected for the new signature is displayed in a text field 1206. Once a signature has been created, it will be included in a "Completed Signatures" field 1208. As will be described in detail below, multiple signatures can be derived from the same audio file. The hostname for which the signature is being prepared is optionally entered in a text field 1212. By convention, the string entered in field 1212 is the name of the script for which the signature was first developed. Such data are for informational purposes only, and are not required by the voice server.

The audio sequence (i.e., the audio file) for which a signature will be made can be many seconds long, and the audio sequence is displayed as an audio amplitude waveform in a panel 1220. The create signature tool is coupled to the speaker output of the computer, and control buttons 1228, 1232, 1234, and 1236 may be used to listen to the selected audio. Button 1236 is a stop button that terminates audio playback. Button 1234 is a play-all/pause button, and if this button is activated, the entire audio sequence is played, starting at the beginning. Button 1228 is a play phrase button that causes only a selected portion of the audio sequence to play. That selected portion corresponds to the portion residing between phrase cursors 1241A and 1241B. The phrase cursor indicates the reference phrase (i.e., the segment) of audio from which the new signature will be built. In a preferred embodiment, phrase cursor 1241A is a green line, and phrase cursor 1241B is a black line, but these colors are not important. Under a default setting in this embodiment, the reference phrase delineated by phrase cursor 1241A and phrase cursor 1241B is five seconds in length. The phrase cursors can be moved within the audio sequence using a cursor slider 1232.

The user chooses the best reference phrase (i.e., the best selected segment of the audio sequence displayed in panel 1220) using cursor slider 1232, and playloop button 1228. The slider can be moved while the audio is playing, and this feature is of great utility in finding the right phrase (the slider is moved until the phrase is heard). Once the reference phrase has been chosen, and the chosen name for the signature has been entered in "Select Token" text field 1206, the user presses a "Make DFT" button 1226.

Figure 10:
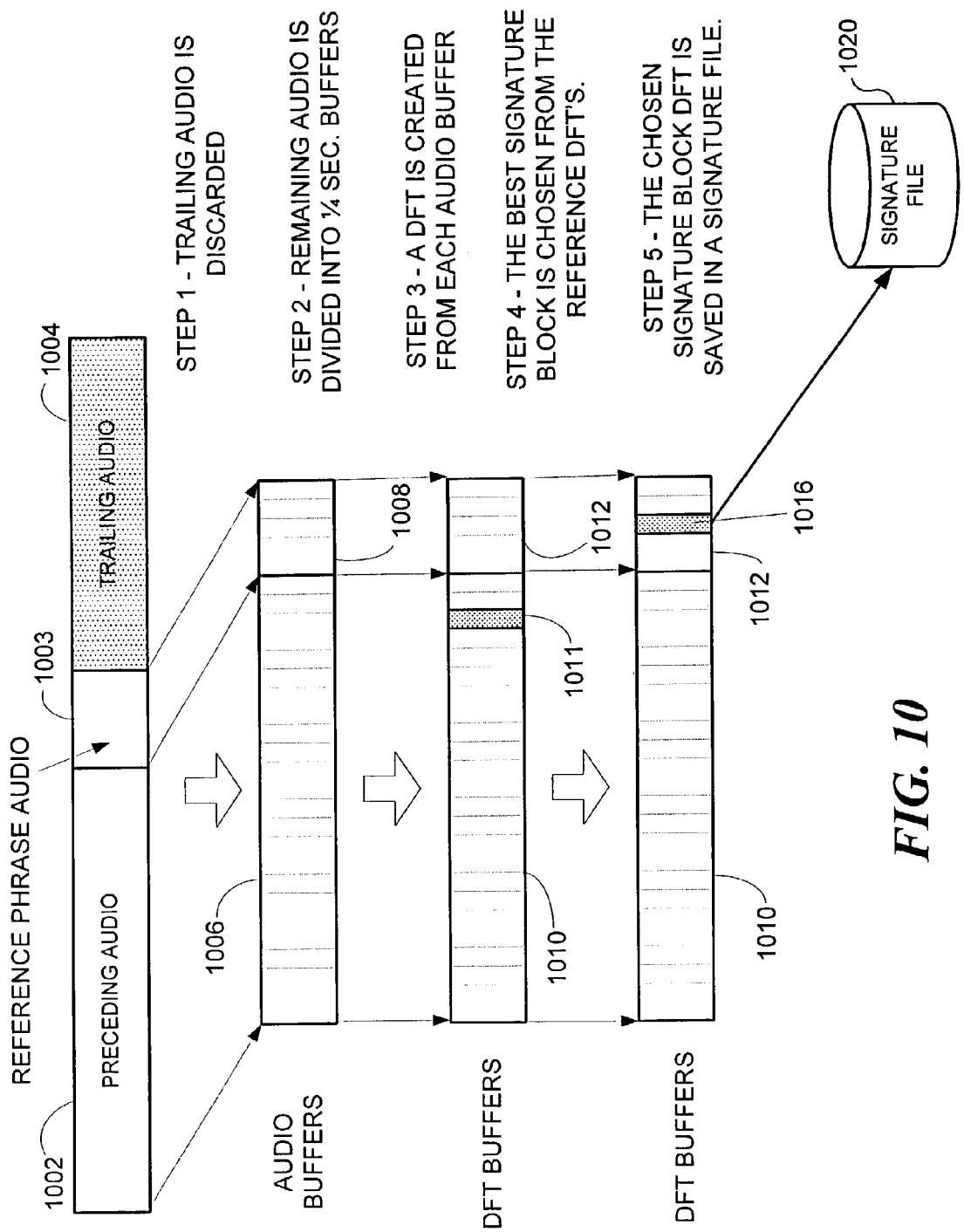
FIG. 10 is schematic diagram illustrating the process employed for generating a signature file from captured audio sequences in accord with a preferred embodiment of the present invention.

The process performed by the create signature tool in response to the activation of "Make DFT" button 1226 is schematically illustrated in FIG. 10. The process involves five steps. Initially, the entire audio sequence is divided into three segments: a segment 1003 corresponding to audio under the reference cursor, a segment 1002 corresponding to the audio preceding the reference cursor, and a segment 1004 corresponding to the audio following the reference cursor. In a first step of the create signature process, the trailing audio (segment 1004) is discarded. In a second step, the remaining audio (segments 1002 and 1003) is divided into ¼ second segments, resulting in a plurality of buffers 1006 corresponding to segment 1002, and a plurality of buffers 1008 corresponding to segment 1003.

Next, in a third step, a DFT operation is performed on the contents of each of audio buffers 1006 and 1008, resulting in a plurality of DFT buffers 1010 and 1012, each of which is the result of processing the corresponding audio buffers with the DFT function. Buffers 1010 and 1012 are thus referred to as DFT buffers. Note that DFT buffers 1010 correspond to segment 1002 and buffers 1006, while DFT buffers 1012 correspond to segment 1003 and buffers 1008. Thus, DFT buffer 1011 is based on a single ¼ second buffer from segment 1002.

In a fourth step, the create signature tool selects a single DFT buffer corresponding to the audio under the reference cursor (i.e., from the plurality of DFT buffers 1012, each of which are based on segment 1003). For convenience, the selected DFT buffer will be referred to as the selected DFT (or the best DFT). The selected DFT preferably is least like any of the DFTs derived from the preceding audio (i.e., DFT buffers 1010). A function described in detail below is used to evaluate the differences among the DFTs, to facilitate the selection of the single DFT. As illustrated in FIG. 10, DFT buffer 1016 has been selected as the best DFT. In a fifth step, the selected DFT is saved in a signature file 1020.

While the method by which the best DFT to form the new signature is chosen is very simple, it is quite important. In fact, the selection of a best DFT is an important element in enabling successful functioning of the voice server application. It can be understood with reference to the following observations:

1. The preceding audio (i.e., segment 1002) contains the audio between the start of the message and the reference phrase audio (i.e., segment 1003). This segment of audio represents the ambient environment in which the phrase occurs and may include other "phrases" that are not used as a basis for recognition.

2. It is very important that the best DFT correlates poorly with any of the preceding audio, so that the preceding audio is not incorrectly recognized as the reference phrase.
3. It is very important that the best DFT correlates well with the reference phrase (i.e., segment 1003), so that the recognition engine can be easily triggered.

In order to choose the best DFT, which meets the criteria defined by observation 2 and observation 3 (as described above), the processing proceeds as follows:

For each of the plurality of DFT buffers 1012 corresponding to the reference cursor audio portion (i.e., corresponding to segment 1003), a correlation coefficient, c, is calculated between it and each DFT of the preceding audio region (i.e., for each of the plurality of DFT buffers 1010). For each DFT in the reference cursor audio region, the maximum value of c, over all the DFT buffers 1010 corresponding to the preceding audio portion, is recorded as $c_{MAX}$. While FIG. 10 appears to indicate that DFT buffers 1012 include five individual DFT buffers, in a preferred embodiment, each DFT buffer is based on an audio sample ¼ second in length, and the reference cursor audio portion is 5 seconds in length. Thus, a reference cursor audio portion (i.e., segment 1003) 5 seconds in length will include 20 discreet ¼ second samples (i.e., 5÷¼=20), from which 20 different DFT buffers 1012 can be generated. For each DFT in the reference cursor region (i.e. DFT buffers 1012), a correlation coefficient, k, is calculated between itself and all the other DFT buffers 1012 in the reference cursor region, excluding itself. For each DFT, the largest value of k is recorded as $k_{MAX}$.

For each DFT buffer 1012 in the reference cursor region, the value $L_i$ is calculated according the following formula.

$$L_i = \mathrm{sqrt}((1-c_{MAX})^2 + k^2_{MAX})$$

The values of c and k lie between 0 and 1.

$L_i$ is the distance of the particular DFT from the origin the two-dimensional Euclidean space defined by (1−c) and k. High values of L are therefore preferred, as they indicate low values of c (high values of 1−c) along with high values of k.

The DFT with the greatest value of L is chosen as the best DFT for use in the signature.

Referring once again to FIG. 12, the best DFT selected by the above function (and the associated data) is saved in the signature file using a save button 1218. Preferably before the new signature is saved, the signature is inspected to determine if it is a good candidate. One such inspection process would be to test the selected best DFT against the audio file selected, to see if the selected best DFT properly identifies the audio file in question. This process is described in greater detail below. If it is determined that the best DFT selected based on a specific reference cursor audio portion does not provide the desired audio file recognition performance, slider 1232 can be used to move reference cursors 1241A and 1241B, so that a different reference cursor audio portion is selected. Then "Make DFT" button 1226 may be pressed again, so that the five step process described in conjunction with FIG. 10 is executed once again. This can be repeated as often as desired before the signature is saved. The create signature tool is closed using a cancel button 1219.

The determination of whether a given DFT is a good candidate is ultimately a matter of judgment and experience. To aid in the choice, the create signature tool provides a number of aids to assist a user in determining if a selected best DFT will provide the desired audio file recognition performance. These aids, identified in FIG. 12, include:

The audio spectrum of the chosen reference signature (i.e., DFT 1016 from FIG. 10) is displayed in an upper panel 1242 of the create signature tool, whenever "Make DFT" button 1226 is pressed. The spectral display enables the experienced operator to distinguish between noise and speech, and therefore to adjust the reference point to correspond to a clean segment of speech. The DFT shown in panel 1242 of FIG. 12 exhibits ordered spectral peaks, and thus likely corresponds to a clean speech segment of audio.

The value of the c and k for the best DFT, correlated with each DFT in the preceding audio portion (i.e., DFTs 1010 corresponding to segment 1002 of FIG. 10) and the reference phrase (i.e., DFTs 1012 corresponding to segment 1003 of FIG. 10) is displayed in red as an overlay 1238 on the audio timeline. The y scale in this case covers the range 0 to 1. A green horizontal line 1240 indicates the maximum value of k.

When a DFT is calculated, phrase cursor 1241A (a vertical green line in this embodiment) moves to indicate the start of the chosen signature block.

The value of k is displayed in a dialog box 1215.

In order to determine if the chosen signature block is a good choice, a number of heuristics are applied, as follows:

If the audio segment corresponding to the best DFT does not look like speech (as indicated by observing the DFT displayed in panel 1242), that best DFT should be rejected. This event is very unlikely, if the reference phrase corresponds to speech.

If the value of k (as displayed in dialog box 1215) is below 0.75, that best DFT should be rejected.

If the peak values of c, as displayed in red overlay 1238 are above 0.4, then the DFT should be rejected, as values over that amount are likely to result in incorrect recognition.

The example in FIG. 12 matches well with the above defined parameters, and is therefore an excellent candidate for use in creating the tsEnterPassword signature.

In any event, if the user is dissatisfied with the best DFT selected, the user can mover slider 1232 to another portion of the audio file, as represented in panel 1220, to select a different best DFT.

Fine Control of Create Signature

In addition to the controls described above, the user has access to a number of additional controls over signature parameters from within the create signature tool. A quantum control field 1230 can be used to improve the discrimination of the values of c. According to the value of this integer value (q>=1), each reference DFT 1012 is compared to the preceding audio, as is schematically illustrated in FIG. 17.

Figure 17:
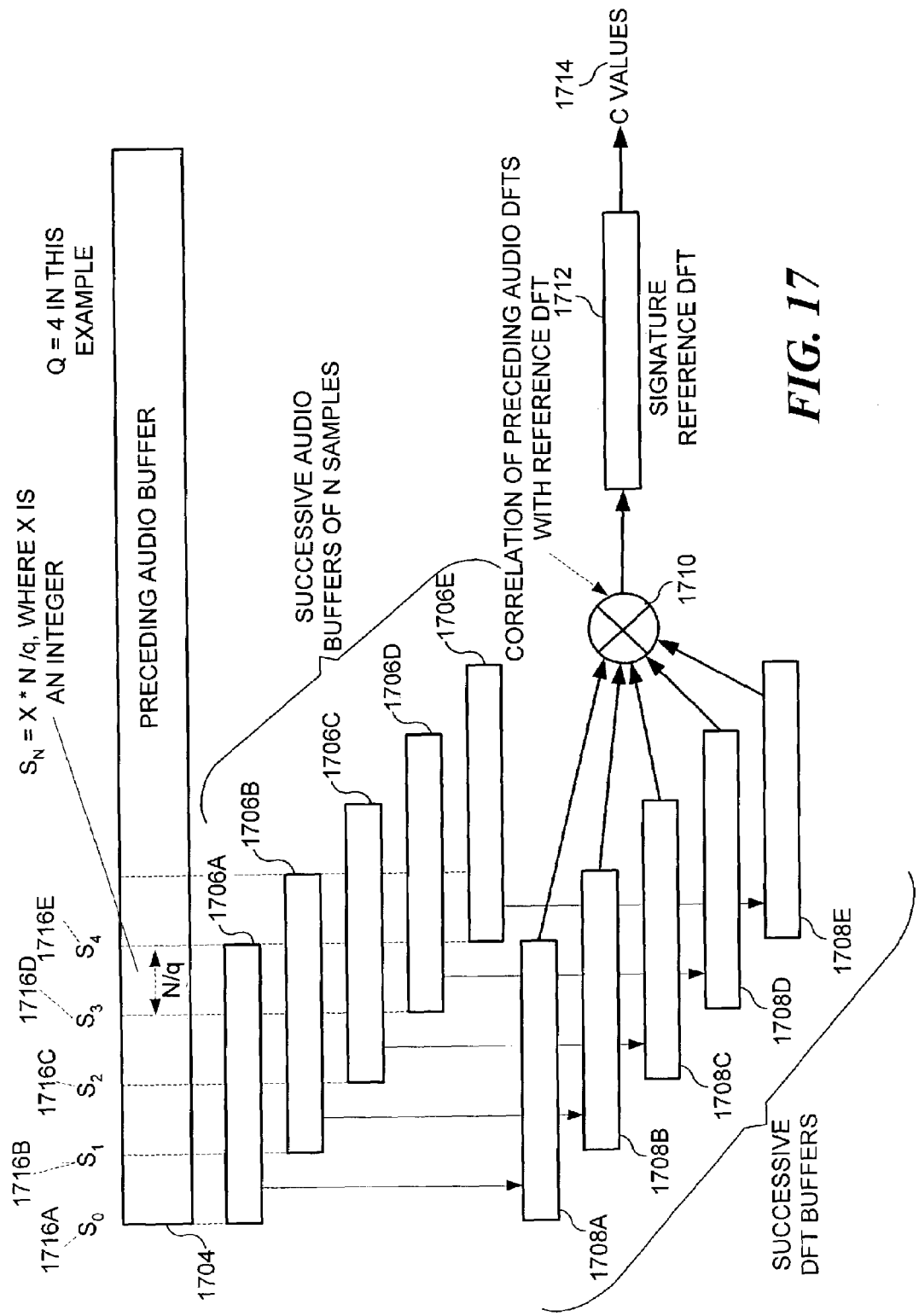
FIG. 17 is a schematic diagram showing how overlapping audio buffers are used in determining the best signature block during signature creation.

FIG. 17 illustrates the case where q=4. In a preferred embodiment of the voice server application a value of 10 is used, hence the default value shown in field 1230, but 4 is a good value for illustrative purposes. The method illustrated in FIG. 10 implies a value for q of 1, again for illustrative purposes. Referring to FIG. 17, an audio buffer 1704 contains all the preceding audio with which a candidate reference DFT 1712 will be compared.

DFT 1712 corresponds to the DFT of a specific ¼ second buffer of the reference phrase segment (segment 1003 from FIG. 10). It is DFT 1712 for which the values of c are being calculated (as indicated in FIG. 17, c is a result 1714 of the comparison of DFT 1712 with DFTs 1708A–1708E). The ¼ second size of each buffer is a default value. The width of each preceding audio buffers 1706A-1706E, from which the preceding audio DFTs 1708A-1708E are calculated, must be the same width as the reference phrase segment. Thus, if the audio reference phrase segment is 5 seconds long, and each buffer is ¼ second, then the audio reference phrase segment includes 20 buffers, and each preceding audio buffer 1706A-1706E includes 20 (¼ second) buffers. In other words, the audio reference phrase segment and each preceding audio buffer 1706A-1706E have a width of N audio samples.

The value of q determines how far the staffing point of the "preceding audio" buffer is advanced for each DFT calculation. N must be exactly divisible by q in the same manner as N/W must be an integer in the discussion of FIG. 15, above.

If q=1, then the starting points $S_0$-$S_4$ (respectively labeled 1716A-1716E) advance by exactly N between each successive portion, and the audio buffers used to calculate c values never overlap. If q is greater than 1, the buffers overlap. The overlap is important, because in the operational mode the starting point of any preceding audio portion cannot be predicted exactly, therefore this variability needs to be introduced into the calculations. If q is greater than 1, the time resolution of the calculations are effectively increased by a factor of q. The higher the value of q, the greater the processing burden, and while this is not a major issue during the operation of the create signature tool (which is not a real-time activity), it is a significant operational trade-off. It has been empirically shown that a value of 10, with a sample size of ¼ second, performs quite satisfactorily in a preferred embodiment of the present invention.

The method schematically illustrated in FIG. 17 is similar to the sliding window technique used by the recognition engine, described above and shown in FIG. 15. The use of an overlapping audio window in both the recognition engine and the create signature tool is an important factor in providing satisfactory performance in the present invention. Without overlapping windows, the performance of the preferred embodiment is marginally satisfactory. However, by using sliding windows (as described in conjunction with FIGS. 15 and 17), the performance of the present invention improves remarkably.

A mean factor control 1224 is available in the create signature tool GUI of FIG. 12 and is used to selectively control the DFT samples that are to be considered in the calculation of c values. Each DFT sample is examined and compared to a value, and only DFT samples that exceed that value will be used in the correlation calculations. The specific value employed is the mean of the preceding sample DFTs multiplied by a mean factor. The mean factor can be adjusted using mean factor control 1224. For example, if mean factor control 1224 is set to 2, then only DFT values that exceed twice the mean value will be used in the correlation calculations. Proper adjustment of this control has the effect of removing noise (which has a low amplitude) from the comparisons. It has been empirically determined that selecting a mean factor of 2 usually provides good results.

Referring once again to FIG. 12, a timeout field 1216 corresponds to a functionality that was used in testing and is now obsolete. The timeout value is specified in the host script (see the above description of FIG. 5).

A threshold correlation coefficient displayed in field 1214 corresponds to a critical value. The threshold correlation coefficient determines the sensitivity of the recognition process. When the signature is created, the default value indicated here is defined as equal to one half the difference between k (displayed in field 1215) and 0.5. Typically, for good signatures, the value calculated is greater than 0.62 (indicating a value for k of 0.84 or greater). The user can manually adjust this value (using the slide bar adjacent to field 1214) if desired, before the signature is saved. Threshold correlation coefficient values below 0.6 are suspect, as are k values below 0.8 The threshold correlation value displayed in field 1214 is saved in the signature file and is used by the recognition engine. Note that field 1215 is not a user selectable field.

Since signatures are files, they can readily be copied between voice servers, and signatures prepared on one voice server can be used by other voice servers. Typically, in a multi-server operation (see below), one computer running the create signature tool is employed to prepare signatures that will be used by multiple Voice servers. The create signature tool can therefore be implemented as a separate application built around the Voice server, but operated independently of the operational servers.

Editing Signatures

It may be desirable to recalculate an existing signature. The create signature tool can function as an editing tool for this purpose. When the voice server application is operating in manual mode, the create signature tool can be started at any time. In this case, all the installed signatures are displayed and may be chosen from a drop-down selection box 1204. Since the system keeps the audio for all existing signatures, panels 1220 and 1242 instantly shows both the audio file and the DFT of the existing signature for the audio file. The phrase cursor is positioned over the existing reference phrase, and the name of the audio file associated with the signature is displayed in a dialog box 1210.

At this point, the user may recalculate the DFT after moving the cursor, delete the signature (using delete button 1222), change the name of the signature (using text field 1206), and/or modify the threshold correlation value in field 1214. Once any such changes are complete, the existing signature can be overwritten using save button 1218. If the name has changed, a new signature is created, so it is possible to derive new signatures from old signatures at any time. If the DFT has not been recalculated, only the changed, non-DFT values (e.g., the threshold correlation coefficient) are saved.

How New Phrases May be Learned Remotely

As described above and as discussed in greater detail below, the present invention enables the distribution of digital audio messages via email. Furthermore the service element of a preferred embodiment of the present invention enables one computer, attached to a voice modem, to act as a server for remote devices that lack a voice modem. In the simplest situation, the configuration of the voice server application to learn how to interrogate a new type of host (i.e., a new voicemail service, or VR system) is executed and controlled by a user using the computer that implements the voice server application.

Figure 13:
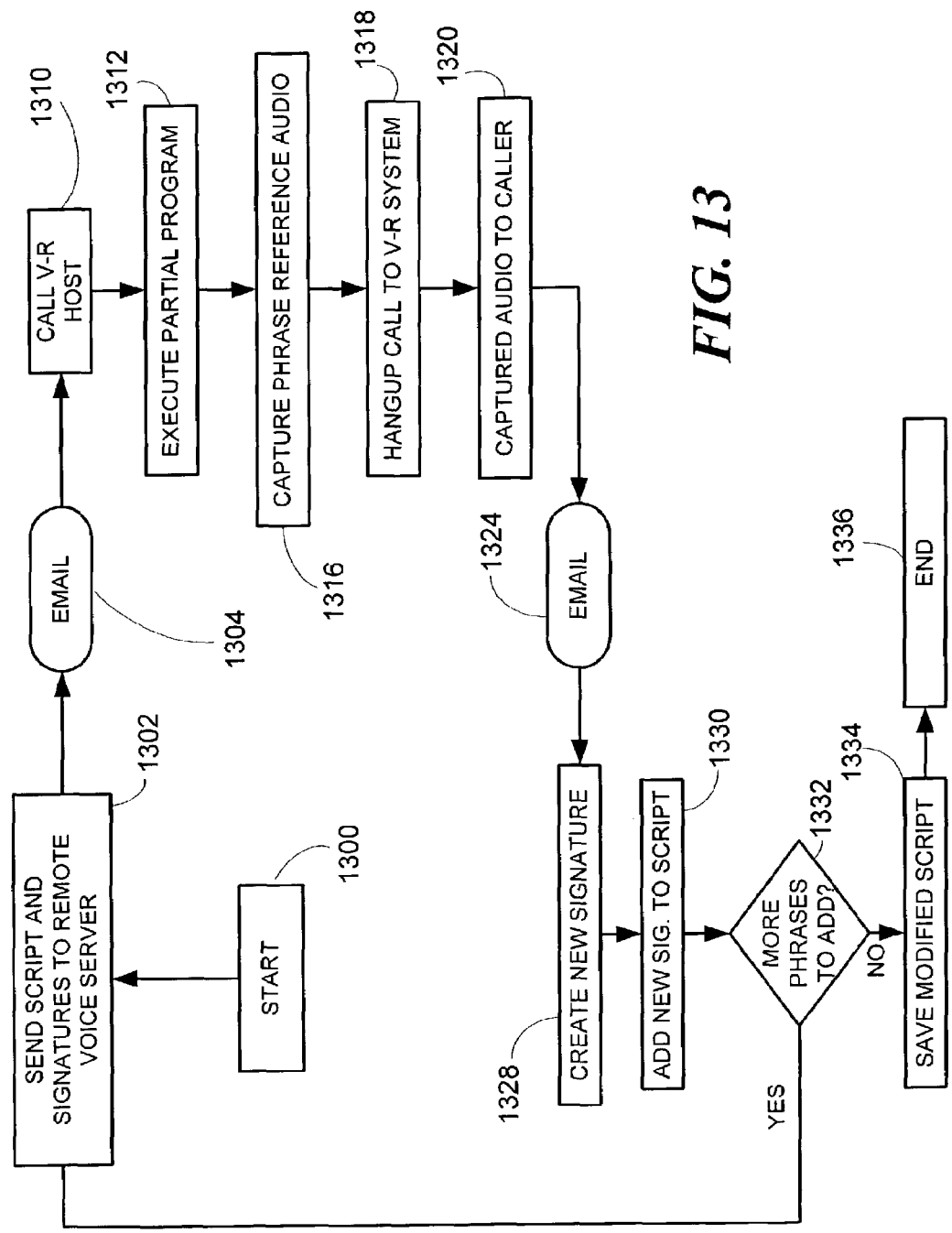
FIG. 13 is a schematic flowchart of the interactions between two computers using the invention, wherein it is possible for the two computers using the invention to configure the recognition of audio messages generated by a third computer and learn the appropriate actions associated with them, with the first computer having no real-time access to a modem.

On the other hand, it is sometimes useful to enable a user to teach the Voice server application to handle a new voicemail host remotely (i.e., from a remote computer that lacks a voice modem). For example, the voice server application may be physically remote from the system administrator. The method of remotely configuring the voice server application to support a new VR host is illustrated in the flowchart of FIG. 13, which enables the voice server application to generate signatures that are to be used to recognize one or more phrases. The process begins at a start block 1300 (and subsequently ends at an end block 1336). The remote computer, upon which the voice server application resides, prepares a host script in a block 1302, and any signature files needed by another server to gain access to the VR host. Once the server computer has access to the VR host using this script, the script enables the server computer to obtain new phrases (i.e., audio prompts to which a specific response is required to navigate a menu in a VR host) from a VR host. That captured audio is returned to the remote computer, and the voice server application residing on the remote computer then generates new signatures that will enable the voice server application to recognize such phrases at a later time.

In a block 1304, the host script prepared in block 1302, and any other configuration information required to enable the server computer to gain access to the VR host, are sent via email to the server computer. When the server computer retrieves this email, the host script and information supplied by the voice server application residing at the remote computer are used by the server computer (running the voice server software and using the scripts and signatures sent by the remote computer) to call the remote VR host (i.e., the remote voicemail system), as indicated by a block 1310. The server computer uses its voice modem to connect to the VR host. Once the connection is established, the server computer executes the host script (emailed from the remote user) in a block 1312. The script enables the server computer to navigate the VR host to the point where the phrase to be learned begins. In a block 1316, the server computer captures the audio containing the new phrase to be learned, as described above with respect to FIG. 9. Since the server computer does not know precisely where the phrase being learned ends, the script captures all the trailing audio (in the manner described above). In a block 1318, the server computer terminates the connection, and then in a block 1320, the server computer returns the captured audio (via email) to the voice server application residing at the remote computer. Once the captured audio has been retrieved by the remote computer (via email, as indicated in a block 1324), it is processed in a block 1328 using the create signature tool, as described in conjunction with FIG. 12, to create a signature for the new phrase. In a block 1330, the new signature and supporting data are added to the host script for the VR host to which the server computer is connected. The process of configuring a new host is normally a multi step process. In a decision block 1332, the voice server application determines if additional phrases need be learned. If so, the process returns to block 1302, and additional script is prepared to once again enable the server computer to capture a new phrase from the VR host. If, in decision block 1332, it is determined that no more phrases need to be learned, then the modified host script is saved in a final version in a block 1334. The process then terminates in a block 1336.

The Service

As discussed above, the preferred embodiment consists of three elements. The voice server application has been described above. The second element is the service, which is built around the voice server application to enable multiple users to access and manipulate their voicemail and other audio messages over the Internet. Thus, in one embodiment, the voice server application resides on one or more server computers, enabling a plurality of clients to access the functionality of the voice server application using the service. The following discussion relates to FIG. 1B, which schematically illustrates the service.

By maintaining scripts for multiple hosts, a single voice server can serve multiple VR systems and multiple users simultaneously. For users sharing the same VR system, no new signatures need be learned. Only the users' passwords and telephone numbers, etc. need be substituted into the host script for their particular type of VR system.

The service functions as an Internet service, with the primary user interface operating over the World Wide Web (although versions of the service could also function on private networks). Users pay for a subscription to the service, and each user has a private Webpage where the user can review and manage the user's voicemail messages. A user can set up an account to retrieve voicemail from any of the voicemail services supported by the host scripts installed on voice servers 129 and 130 (as described above, voice servers 129 and 130 can be implemented on one or more computers that collectively make up spooling computer system 144). Although the voice server application works fine over long distance, or even International telephone circuits, in its normal configuration, the service supports scripts for all public voicemail services, and any private scripts for commercial customers, all of whom can be reached by a local call from service center 141. With the exception of the voice servers, each of which in a preferred embodiment are implemented on their own separate computer using the Windows™ operating system, all other functionality can be provided by a single computer running a Linux™ operating system. The Web interface is provided through a familiar and standard Web site server software package (e.g., the Apache™ Web site server software), and the service uses off-the-shelf components to complete the application, including a relational database, a scripting language (personal home page or PHP scripting language), and the Linux™ email system. Messages are stored as files in Linux-based message store 128, and such messages are accessible by both Linux™ programs and the voice servers using a standard network file system (the Samba™ software is employed in a preferred embodiment of the present invention).

A number of scripts and C++ programs run on the computer running the Linux™ operating system to interface between the Web site and the system control and configuration functions. The primary control function is to place jobs in the schedules of voice servers 129 and 130. In addition, a preferred embodiment includes a C++ application that runs on the computing device running the Linux™ operating system and routes incoming messages. Those of ordinary skill in the art will recognize that such functionalities are standard with respect to spooling systems and can be implemented using a variety of techniques. The specific techniques described in a preferred embodiment of the present invention are not intended to be limiting. In such a spooling system, a queue of commands (the jobs queue) is generated by one application, and the queue is read and its commands are executed asynchronously by a second application. One advantage of the spooling system is that the two applications may function independently from each other, enabling their functions to spread across multiple computers without the need for sophisticated synchronization.

Figure 20:
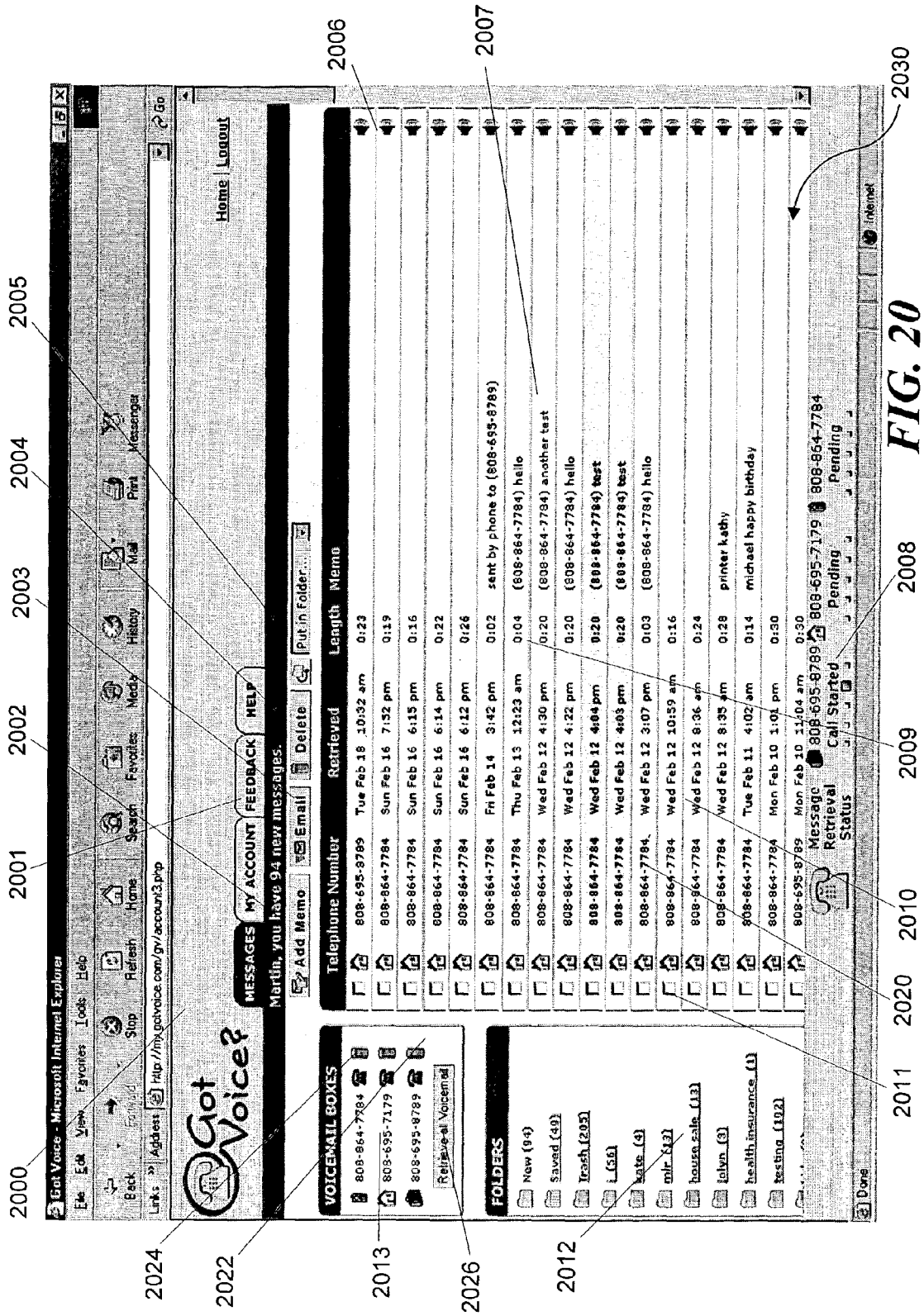
FIG. 20 is an exemplary embodiment of a Web page for a Voice-Messaging Web site ("http://mygotvoice.com"), used in conjunction with the audio messenger application, in accord with a preferred embodiment of the present invention.

Referring once again to FIG. 1B, Web interface 122 is the primary user interface with the service. The user uses a Web browser application 120 to communicate with the service. Once the user has completed a login step (a preferred embodiment uses subscriber's telephone numbers and voicemail PINs as the password), the user reaches the voicemail homepage of the user. An exemplary homepage 2000 is illustrated in FIG. 20. The voicemail messages are displayed, one to a line, in a main frame 2030 of the page. Each message is tagged with a telephone number 2020 from which the message was retrieved, a time and date 2010 of retrieval, and a length 2009 of the message in minutes and seconds. A space 2007 is provided for each message so that messages can be given a textual memo by the user, or by the system. The user can play a message by clicking on a speaker icon 2006 to the right of the message. This action causes the user's installed streaming media player 142 (FIG. 1B) for MP3 files to start and play a stream of audio delivered by the service.

Users may select one or more messages using checkboxes 2011 at the left of each message, and they may then apply various actions to those messages using the buttons 2002, 2003, 2004, and 2005, which perform the labeled action on the selected message(s). Selecting add Memo button 2002 enables the user to change the text memo associated with the selected message(s). Email button 2003 enables the user to forward the selected messages as attachments by email. Delete button 2004 moves the selected message(s) to a trash folder. Put in Folder button 2005 is a pull-down menu list of the folders displayed at the left of the page, in a frame 2012. These folders are created by the user to manage the messages received by the user more easily. The saved and trash folders are provided by the operating system. All deleted messages are kept in the trash folder until the user affirmatively deletes them. A user may move between folders and have the messages displayed on the mainframe by clicking on the chosen folder, in frame 2012. The new folder in frame 2012 leads to a user interface for managing folders.

The user can also control message retrieval by the voice servers from their Webpage. Note that a frame 2013 (labeled Voicemail Boxes) of homepage 2000 indicates that three telephone numbers are supported in this exemplary account. By clicking on a telephone icon 2022 that is disposed next to the appropriate number, a user can initiate voicemail retrieval for that number. By pressing on a trashcan icon 2024 next to a number, a user can delete the messages still saved on that telephone voicemail account, using the voice server. A "Retrieve All Voicemail" button 2026 is provided to retrieve messages from all their telephone voicemail accounts in one step. Activation of buttons 2022, 2024, and 2026 causes the system to create jobs in the jobs queue of voice server 130 (FIG. 1B). The progress of any retrieval calls is displayed on a call status bar 2008. Various configuration, help, and account administration functions are provided through tabs 2001, on Webpage 2000.

Referring once again to FIG. 1B, Messages and commands can be sent into the system via the email gateway 125. Audio messaging application 123 (described in detail below) can be used to send a message, composed on an Internet computing device, to email gateway 125 via email. If this message is correctly addressed, the message can be deposited in the Inbox of one of the service's users in message store 128, or forwarded by telephone to an external telephone number via a job being placed on the job queue of the "send by telephone" voice server 129. The job command includes a copy of the message to be sent.

Telephone text messaging services can be used to send commands directly from mobile telephones 166 to the service using PSTN line 164, via email gateway 125. Typically, such commands are used to initiate the fetching of voicemail before the user is at their computer. This ability for users of the service to initiate retrieval remotely, without Internet access, enables the service to avoid polling users' voicemail accounts except when the users want their voicemail, but at the same time, enables the users' messages to be ready before they reach their computer. For example, users can send text messages to the service from within their cars before they reach home, and the service will retrieve their messages, such that the messages are ready for review by the time the users arrive at their homes.

Outgoing Internet email interface 127 enables two functions of the service. A first function relates to the forwarding of copies of messages by email, either on user demand, or automatically, as part of the service. For example, automatic email forwarding will enable a user to automatically receive copies of all voicemails for the user on the user's PDA. The second function of email interface 127 is to allow a user to automatically receive voicemail within the user's email client 126. In the latter application, each user is provided with an email address on the service (e.g., 8088767787@gotvoice.com). Whenever a user retrieves email at this address (by calling the service over email interface 127), the user will initiate a call that will retrieve voicemail saved for the user's telephone number(s). The user will thus receive an email with the voicemail messages included as attachment(s).

Since the service enables its users to consolidate voicemail from multiple telephone accounts in one place, it functions as a universal voicemail service. In order to capitalize on this feature, the service itself offers a standard Voicemail system interface 140 to its users. In a preferred embodiment, voicemail system interface 140 is a standard Linux™ software package (vgetty™) that interfaces with message store 128. Users dial-in using telephone 139 and PSTN line 135 to reach the service's voicemail access number and then listen to their messages, just as done with conventional voicemail system. However, the present invention enables each user to access all the user's voicemail, for all of the user's telephone accounts, with one call. Interface 140 provides all the standard telephone voicemail message review and management features, controlled from the telephone keypad.

Send-by-Phone

One of the functions of the service is a Send-by-Phone function. This functionality uses the voice server application differently. Instead of capturing audio, the voice server application plays audio down the telephone connection. The voice server calls the recipient of the message directly, even if they are not a subscriber to the service. The host script used to send the message can discriminate between the telephone being answered by a human and one answered by a machine. When the telephone is first answered, the voice server plays a message such as "press star for an important message from <whomever>." If a human answers and presses the * key on their telephone, the human will hear the message directly. If however, the incoming audio is interrupted by a beep, the voice server staffs playback and leaves the message on the recipient's voicemail or answering service telephone. If no star key is pressed and there is no beep, the message is retained and the call is attempted again at a later time. The above sequence is very important, because it minimizes the annoyance to the recipient and ensures delivery of the voicemail. In order to make send-by-phone function in this manner, two additional recognition features of the preferred embodiment are used. The first allows the host script to distinguish between spoken voice and machine generated tones (i.e., beeps). By placing the statement "expect Voice" in the script, the associated actions will be executed whenever human speech is heard by the voice server. If the statement "expect Tone" is placed in the script, then the associated actions will be executed whenever a tone (of any frequency) is heard. Tables 1-3 provide examples of other expect statements, and the "expect Voice" and "expect Tone" statements are prepared in a similar manner. These functions are implemented in the voice server as built-in signatures that are triggered based on the number of frequency peaks in the incoming audio. If the number of frequency peaks in the DFT of the incoming audio falls below a threshold, then 'expect Tone' is triggered. If the number of frequency peaks in the DFT exceeds a certain threshold, then 'expect Voice' is triggered. In a preferred embodiment the value 6 (i.e., 6 peaks) is used as the threshold for Tone recognition and the value 20 (i.e., 20 peaks) is used as the threshold for Voice recognition, as speech normally includes more spectral peaks than does a machine generated tone or beep. The second feature which supports send by phone is the ability of the host script to be triggered by an incoming DTMF tone from the user (e.g., */star in the above example). In order to recognize a particular DTMF tone, the statement 'exdtmf <tone>', where <tone> is any single DTMF character (0123456789*#ABCD), is used. When the user enters the "A" DTMF tone, the actions associated with any corresponding exdtmf clause are executed.

As discussed above, it is possible to compose messages using an Internet appliance (such as computing device executing Audio messaging application 123) on the Internet, and then forward these messages to the service over Internet connection 124, via email gateway 125. Such messages can be routed to message store 128, and either retained there until the recipient retrieves them, or the messages can be sent by telephone via voice server 129, as described above. When coupled with mailing lists comprising multiple telephone numbers, the send by telephone service can be used to construct interesting vertical applications, for example, in the field of telemarketing.

The Flow of Messages within the Service center

The messages arrive in service center 141 by two means: either as email (via email gateway 125) or by telephone (via voice server 130). If the messages arrive by email, they are distributed by a program running on the mail gateway's input, directly into message store 128 or placed into the outgoing message job queue of Send-by-Phone voice server 129. If the messages arrive by telephone, they arrive in a directory (preferably named the "arrival directory") owned by the voice server and accessible by the computer running the Linux™ operating system, over the network. A routine runs periodically (preferably every minute) on the Linux computer and checks for any new messages in the arrival directory. A time stamp of the last check is used to detect new files, and a lock file is used by the voice server to lock out the Linux program during file creation, when there is a danger of copying partial messages. Each message consists of a WAV file containing the message in uncompressed PCM audio format, and a meta-file containing the routing information for the message, its time of retrieval, its length, and other housekeeping data for the message. If a new message is found, the Linux program encodes the audio from the WAV file into another file in compressed MP3 format. This MP3 file is moved directly to the message store directory of the intended recipient. The newly arrived message can then be viewed with Web interface 122. This method has two advantages: (1) the interface is simple and asynchronous, making the system simpler and more reliable; and, (2) keeping copies of the original messages in the arrival directory provides for redundancy and further improves the system's overall reliability.

The Audio Messenger

The third element of a preferred embodiment of the present invention is the audio messenger application (see FIG. 1B, audio messaging application 123). Audio messenger application 123 is a simple popup application that runs on the user's Internet connected computing device. This device should be equipped with a microphone and audio playback capabilities, typically provided through headphones 143.

Using audio messaging application 123, the user may record new audio voice-messages locally and then send them to the service via email gateway 125. These messages are delivered as described above and can be routed to either message store 128, or to the send-by-telephone job queue in voice server 129. An exemplary Windows™ operating system version of a user interface 1800 for Audio messaging application 123 is shown in FIG. 18. A preferred embodiment of Audio messenger was written in the C++ programming language and has been designed to be ported to multiple computer platforms. The user interface includes the following elements:

A record button 1801 is used to start recording a message entered through the microphone. Each time record button 1801 is pressed, the old (previously recorded) message is overwritten.

A play/stop button 1802 is used during playback to stop playback of the audio. If a message has already been recorded and the stop button pressed, then this button displays a play icon (>), and pressing the button starts playback of the recorded audio. Thus, when audio is playing, this button functions as a stop control and when audio has been recorded but is not currently playing, it functions as a play button.

An audio progress indicator 1803. When audio is being recorded or played back, this indicator is animated to provide feedback to the user showing the extent of the message (or relative position within a recorded message that is being played).

A Memo field 1813 is provided to enable a user to type a text memo to appear with the delivered message (if delivered directly into the message store).

An Address pull-down 1812 contains a list of addresses entered in the address book by the user. Entries in the address book preferably include three elements: the address name (e.g. John Smith); the addressee's telephone number (e.g. 8088767766); and (optionally) the addressee's email address. Entries are added to the address book using a +button 1811, which displays a dialog box that enables a new address entry to be added. Entries may be edited using a =button 1810, which enables the currently selected address book entry to be edited and re-saved. A –button 1809 is used to delete a selected address book entry.

A send button 1805 dispatches a correctly recorded and addressed message to the service, via email.

A setup button 1806 displays a dialog box for use in setting up the application. This setup process involves providing the application with personal preferences and login information for the different voice hosts.

A by phone checkbox 1807, if checked, directs the service to attempt to send the message over the telephone using the "send-by-telephone" service of voice server 129 (FIG. 1B). If this checkbox is unchecked, an attempt is make to deliver the message into message store 128 (FIG. 1B).

A hifi checkbox 1808 enables the user to direct the system to encode the message at a higher fidelity than that used for telephone messages. If this checkbox is checked, then the message is encoded in the higher quality format, which enables messages containing, for example, music or a high quality speech recording, to be sent to the service without the loss of fidelity associated with passage over a telephone voice circuit. This option has no effect on the send-by-phone functionality. Normally, a preferred audio messenger application 123 encodes messages in a 16 kbps, monaural MP3 format. If the hifi checkbox is set, then they are encoded in a 64 kbps monaural format.

Recording and Sending a Message

Figure 19:
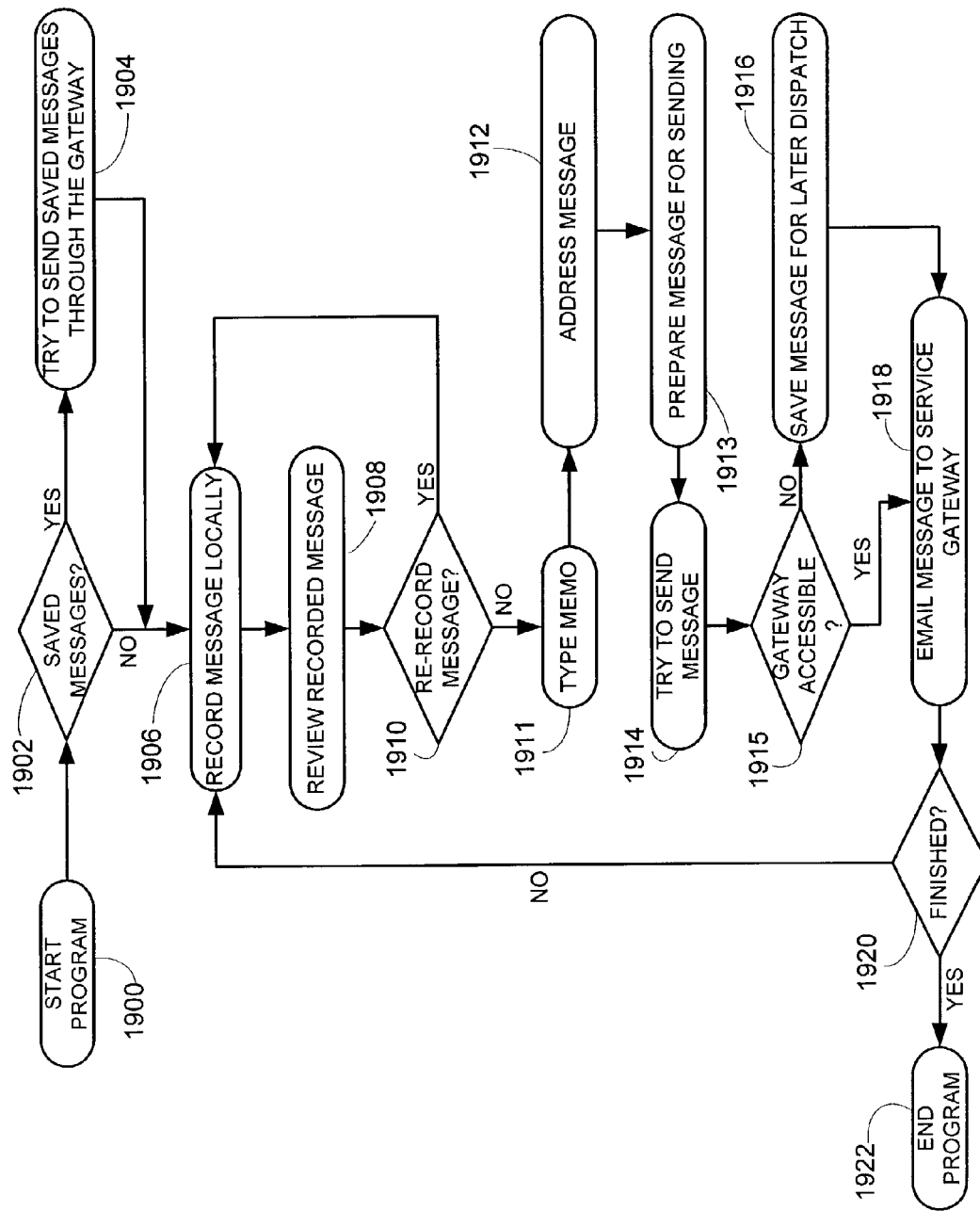
FIG. 19 is a flow diagram showing the logic for composing and sending a message with the audio messenger application.

A flowchart of the process of recording and sending a voice-message with the Audio messenger is shown in FIG. 19. This process staffs at a block 1900 when the audio messenger application is started. In a decision block 1902, the audio messaging application 123 checks to see if there are any messages saved from the last (offline) session. If no messages are saved, the next step in the process is to wait for the user to record a message, as indicated in a block 1906. If there are saved messages ready to send, the audio messaging application makes an attempt to send them via email to the appropriate gateway, at a block 1904. Each branch from decision block 1902 leads to block 1906. In order to record a message to be sent, the user uses record button 1801 (FIG. 18) to start recording, and "stop" button 1802 (FIG. 18) to stop the recording when finished. The manipulation of buttons 1801 and 1802 correspond to block 1906.

Once the message has been recorded, it can be reviewed in a block 1908, using stop/play button 1802 (FIG. 18). In a decision block 1910 the user determines whether the message is satisfactory. If the message is not satisfactory, a new message can be recorded (over the old message), as noted above in a block 1906. Of course, should a user wish to skip the evaluation of decision block 1910, a user can proceed directly to the next step.

If the message is satisfactory, the user can enter a short text memo in a block 1911, which will be delivered to the service with the message. Such entry is optional. In a block 1912, the message is addressed by selecting an entry from an address pull-down list box 1812 (FIG. 18). If necessary a new address is added to the address book first using + button 1811 (FIG. 18). Once the message has been addressed, the user selects any options, such as hifi or send-by-telephone in a block 1913, to prepare the message for delivery. Once any options desired have been selected, an attempt to send the message is made in a block 1914, using send button 1805 (FIG. 18).

In a decision block 1915, the audio messaging application determines if the gateway needed to send the message is accessible. If so, then in a block 1918, the message is sent by email to service email gateway 125 (FIG. 1B). If the service email gateway is not accessible, then in a block 1916, the message is saved locally for sending when the gateway is next available (see block 1904).

In a decision block 1920, the logic determines if the user desires to send another message. If so, control passes back to block 1906 to wait for the user to record another message. If no more messages are to be sent, the user terminates the Audio messenger program, as indicated by a block 1922.

Addressing and Routing by the Audio Messenger

Figure 11:
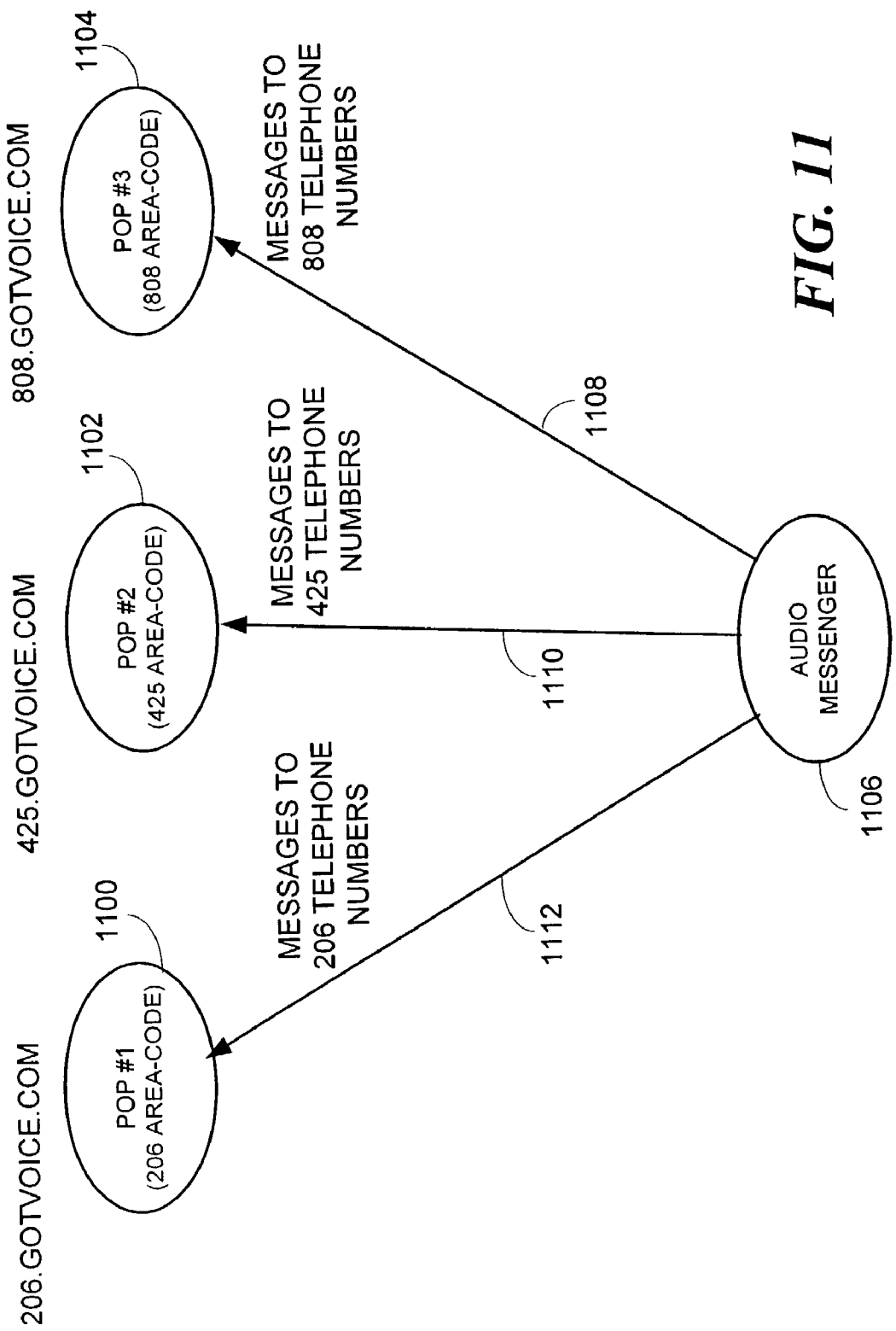
FIG. 11 is a schematic diagram that illustrates how an audio messenger application routes voice messages to an intended destination.

In a preferred embodiment of the present invention, the service element is implemented using multiple service centers, similar to service center 141 of FIG. 1B. FIG. 11 shows an implementation of the service element that includes three service centers 1100, 1102, and 1104. Each service center serves a different area-code. One service center per local calling area is required to enable messages to be retrieved and delivered by telephone at local calling rates. (For the sake of this example, it is assumed that each area-code corresponds to a local calling area for rate purposes).

Each service center, also known as a point-of-presence, or POP, supports all the accounts for telephone numbers within its calling area and also serves as the retrieval and dispatch point for all voice-messaging within the calling area. Voice Messaging, as used herein, refers to the generalized function of sending voicemail messages or messages recorded using audio messenger 1106 by telephone or Internet. Audio messenger 1106 has the same functionality as audio messenger application 123 of FIG. 1B, and is intended to represent audio messenger applications residing on a plurality of Internet-connected user computer devices. Each POP contains at least one voice server performing those functions, and each POP also includes an email gateway function (see email gateway 125 of FIG. 1B) for its calling area.

If a message is to be sent from audio messenger 1106, then it must be directed at the right POP gateway (i.e., to the POP gateway for the recipient's local call area-code). There is no central email gateway, and the various service centers function independently of each other. Messages are routed according to their area-codes and the telephone number part of the address is therefore the critical element. Each POP is represented on the Internet by an Internet hostname corresponding to the area code (or codes) it supports. By convention these service centers are named <area-code>.<service domain>. Therefore, if the service domain is gotvoice.com, then the three POPs illustrated in FIG. 11 have the hostnames as indicated (i.e., 206.gotvoice.com, 425.gotvoice.com, and 808.gotvoice.com). Each of these service centers has a special receiving email address to which messages are directed by audio messenger 1106. Thus, messages for area code 206 telephone numbers (1112) are sent to receiving @206.gotvoice.com, messages for area code 425 telephone numbers (1110) are sent to receiving @425.gotvoice.com, and messages for area code 808 telephone numbers (1108) are sent to receiving @808.gotvoice.com.

It is the function of Audio messenger 1106 to route messages directly. If the area code of the recipient is known, then the Audio messenger can correctly address the message and send it to the correct service center. The routing is implicit in the addressing scheme, and there is no need for any directory or routing infrastructure other that that provided by the Internet's base services (e.g., the DNS service).

Enhancements to the Audio Messenger

Although a preferred embodiment of the present invention that will be commercially employed does not yet include the following functions, they are expected to be added later, to provide enhanced desirable functionality for the present invention. These functions include:

- Providing subscriber specific address books at service centers. Although the user's address book may be stored and maintained locally on the computer where the user runs the audio messenger, providing a centralized address book service, connected to the service, will enable the user access to their address book from any location (or from any device), in a similar fashion to the buddy lists of popular Instant Messenger applications. This facility is of great advantage to a user, since the user need not carry a device in which the address book is stored.
- Providing versions of the audio messenger application compatible with other operating systems will provide other options. By doing so, the voice-messages need not be limited to a personal computer or a laptop computer platform. For example, some PDAs and some smart telephones include dictation functionality. In order to make voice messaging as ubiquitous as possible, it is contemplated that versions of the audio messenger application will be provided for such platforms, including without limitation, computing devices running Microsoft Corporation's Pocket PC™ OS, those running the Palm OS™, Linux™ or the Symbian™ OS.

Providing import functionality to the audio messenger application, such that in addition to recording messages directly using a microphone, the user may also import WAV and MP3 files into the audio messenger, for delivery using the service. These formats have been chosen for their ubiquity, however those of ordinary skill in the art will recognize that many other formats could be used with minimal modifications to the preferred embodiment. Thus the identified formats are not intended to limit the invention.

Providing multimedia functionality. For example, enabling video messages recorded with a WebCam to be sent to the service gateway. Incorporating video playback capability to the service Web site, and adding video messaging to the service represent straightforward extensions of the technology described above.

It should be understood that while in a preferred embodiment of the present invention, the service and the Audio messenger are configured to prepare and deliver audio files, the techniques and elements described above can also be employed to exchange files in virtually any digital format. It is also important to note that although the telephone interface will remain audio oriented, the Internet interfaces need not. In circumstances where a multimedia message is to be sent by telephone, the system can potentially deliver only the audio portion of the message, enabling a recipient to participate in the communication, albeit at a reduced capability. However, full enjoyment of the message will still be available to a user having access to a computer that provides other visual and/or audio capabilities for playing the message.

Facilitating Communication Between Two Computers Using the Present Invention

Figure 14:
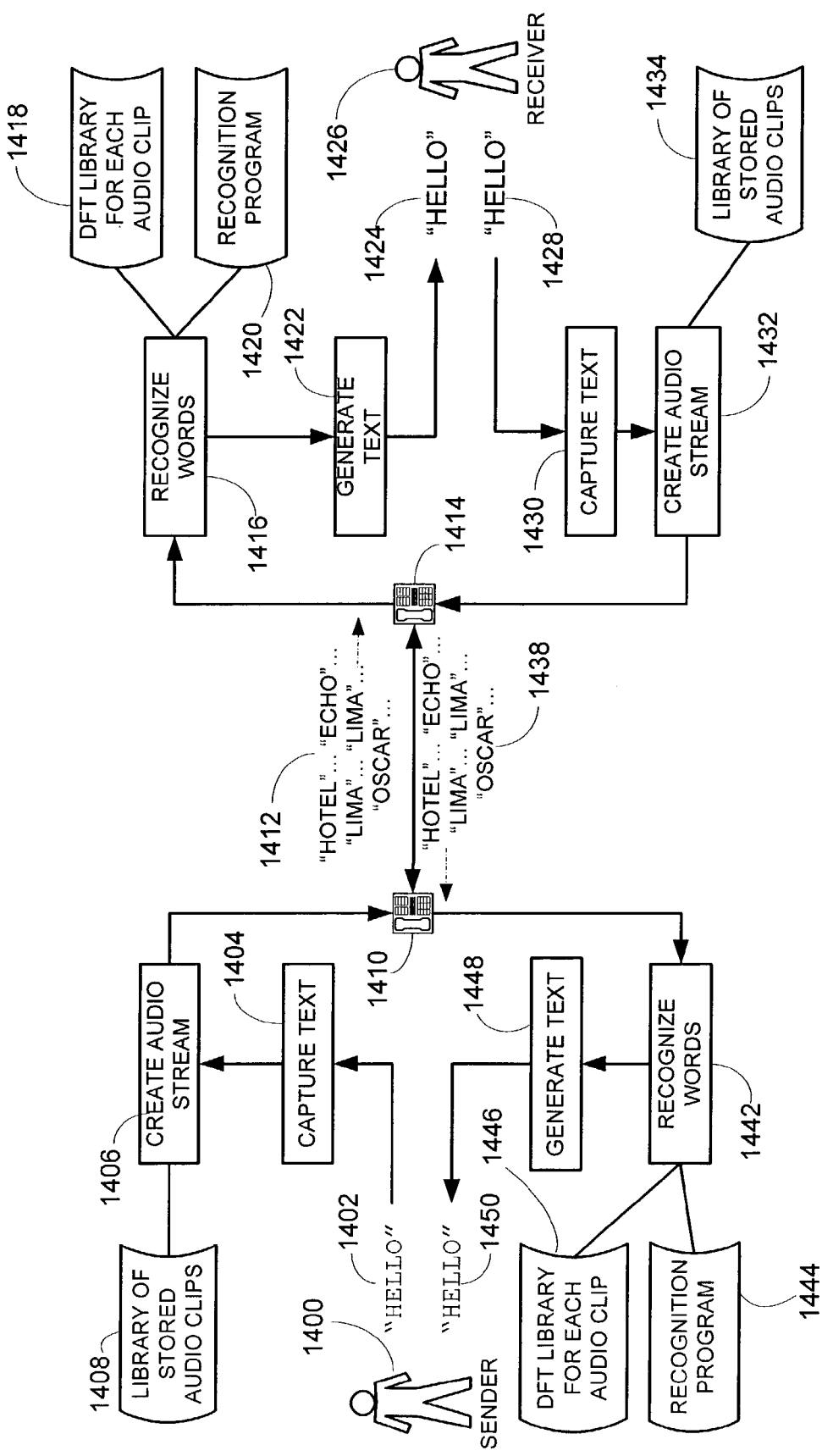
FIG. 14 is a flowchart showing the logic implemented by two computers using the present invention to communicate textual information when employing the human voice as an encoding medium.

In a preferred embodiment described above, the method of the invention is used by a first computer to communicate with a second computer (such as a VR system), where the second computer does not implement the present invention. One additional embodiment of the present invention is directed to two computers that each implement the present invention. When both computers are configured to utilize the present invention, those two computers can be connected using an audio communication channel, such as a telephone line. This embodiment is illustrated in FIGS. 2 and 14. In FIG. 14, an operator/sender 1400 (human or mechanical) inputs the ASCII text "HELLO" into a capture text program in a block 1404, which creates an audio stream encoding message 1402 (i.e., HELLO) as a sequence of audio clips or segments, as indicated by a block 1406. The individual audio clips of the sequence are based on a library 1408 of stored audio clips, or "words". In the example of FIG. 14, it is assumed that each letter in the Roman alphabet is represented by its audio equivalent from the international telephonetic alphabet (i.e., "A" is represented by the spoken word "alpha," "B" by "bravo," etc.). As will be described in more detail below, the specific audio signal employed to represent a particular text entry can be abstract, as long as the system corresponds a specific audio signal to a specific text entry.

A call is made to the remote computer using the telephones 1410 and 1414, and audio sequence 1412 (encoding "HELLO") is played across the telephone connection linking telephones 1410 and 1414. In this example, the sequence for HELLO comprises the words: "hotel". . . "echo". . . "lima". . . "lima". . . "oscar" . . . .

Using the method of the present invention, the second computer recognizes the incoming words/phrases in a block 1416, using a library 1418 of signatures/DFTs (corresponding to the words stored in the sender's library 1408), and a script recognition program 1420 (based on the voice server application described above). When "hotel" is received by the second computer over the audio communication link, the process in block 1416 involves generating a DFT of the incoming audio, and then comparing that incoming DFT with each DFT stored in library 1418, enabling the second computer to identify the text entry corresponding to the audio signal (in this case, an "H" text entry corresponds to the audio signal "hotel"). As the incoming audio signals are recognized, corresponding text is generated in a block 1422, to be communicated to operator/receiver 1426, for example, on a display or as an audible word 1424.

In the example, both the computers are operating in a full-duplex configuration. Each computer has available a library of audio signals that correspond to a specific text entry, and a library of DFTs corresponding to every audio signal that corresponds to a text entry. Thus each computer can convert a text entry into an audio signal, and use the DFT library to recognize an audio signal to recreate a text entry corresponding to that audio signal. Thus operator/receiver 1426 can not only receive messages, but can also send messages back to operator/sender 1400, using the method described above. Thus operator/receiver 1426 can use the second computer to capture a word 1428 as text (as indicated in block 1430), and employ a library 1434 to create an audio stream of sequences in a block 1432. That sequence 1438 is then sent from telephone 1414 to telephone 1410. To enable operator/sender 1400 to decode sequence 1438 in a block 1442, the first computer (i.e., the computer being used by operator/sender 1400) will need to include a library 1450 of signatures/DFTs, and a recognition program 1444.

In the above example, there was a clear correlation between the audio signal (i.e., "hotel") and a text entry (i.e., "H"). It should be understood that the correlation could be entirely arbitrary, enabling coded messages to be sent and received. As long as each computer coupled by an audio link includes matching libraries that correspond audio signals to text, and DFTs to audio signals, communication over an audio link is facilitated. It should also be recognized that in a broadest sense an audio signal does not need to be linked to a single letter of text; rather each audio signal can be linked to a specific data token. Each data token could correspond to a word, a phrase, a sentence, etc.

Although the present invention has been described in connection with the preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to employ a voice response (VR) management application that is accessible at a remote location by the user, to interact with a VR system, wherein the VR system provides audio command prompts to which appropriate responses must be made in order for the user to achieve a desired interaction with the VR system, the method comprising the steps of:
   (a) establishing a logical connection between the user and the remote location;
   (b) teaching the VR management application how to recognize and respond to the audio command prompts issued by the VR system, such that recognition of the audio command prompts is based on a comparison of an audio command prompt received by the VR management application with stored signatures, each stored signature being based on at least a unique portion of a command prompt likely to be issued by the VR system; and
   (c) using the VR management application for automatically performing the following steps to enable the user to achieve the desired interaction:
      (i) establishing a logical connection between the VR management application and the VR system;
      (ii) receiving an audio signal from the VR system over the logical connection;
      (iii) comparing the audio signal that was received with the stored signatures, to identify the command prompt being issued by the VR system;
      (iv) providing any required response corresponding to the command prompt issued by the VR system; and
      (v) repeating the steps of subparagraphs (ii)-(iv) until the desired interaction between the user and the VR system through the VR management application has been achieved.

2. The method of claim 1, wherein the step of establishing a logical connection between the VR management application and the VR system comprises the step of establishing the logical connection according to a predefined schedule, so that the desired interaction occurs on a scheduled basis.

3. The method of claim 1, wherein the desired interaction comprises retrieving voicemail of the user from the VR system.

4. The method of claim 3, wherein after the VR management application has retrieved the voicemail, further comprising the step of emailing the voicemail to an email account of the user.

5. The method of claim 3, wherein after the VR management application has retrieved the voicemail, further comprising the step of forwarding the voicemail to the user through a telephone call.

6. The method of claim 3, wherein after the VR management application has retrieved the voicemail, further comprising the step of forwarding the voicemail to an answering machine accessible by the user.

7. The method of claim 3, wherein once the VR management application has retrieved the voicemail, further comprising the steps of storing the voicemail that has been retrieved so that the voicemail can subsequently be accessed by the user.

8. The method of claim 7, further comprising the step of enabling the user to access the voicemail that has been retrieved and stored, through a telephone call.

9. The method of claim 7, further comprising the step of enabling the user to access the voicemail that has been retrieved and stored, using a Web browser.

10. The method of claim 1, wherein the desired interaction comprises the step of forwarding an audio message from the user to the VR system.

11. The method of claim 1, wherein the step of teaching the VR management application how to recognize and respond to the audio command prompts issued by the VR system comprises the step of generating a corresponding discrete Fourier transform (DFT) for each audio command prompt likely to be issued by the VR system, each stored signature including the corresponding DFT for that stored signature.

12. The method of claim 11, wherein the step of comparing the audio signal received with each stored signature comprises the steps of generating at least one DFT from the audio signal received, and comparing each DFT generated from the audio signal received with DFTs included in the stored signatures.

13. A method for enabling a user to use a Web site to retrieve audio messages left for the user through an audio message facility, wherein the audio message facility provides audio command prompts to which appropriate responses must be made in order to retrieve any audio messages left for the user at the audio message facility, the method comprising the steps of:
   (a) establishing a logical connection between the user and the Web site;
   (b) teaching a voice response (VR) management application accessible through the Web site how to recognize and provide a correct response to the audio command prompts issued by the audio message facility, where recognition of each audio command prompt is based on a comparison of the audio command prompt with stored signatures, each stored signature being based on at least a portion of a corresponding command prompt likely to be issued by the audio message facility; and
   (c) using the VR management application for performing the following steps, to enable the user to access any messages left for the user at the audio message facility:
      (i) establishing a logical connection between the VR management application and the audio message facility;
      (ii) receiving an audio signal from the audio message facility with the VR management application;
      (iii) comparing the audio signal received with the stored signatures, to identify the command prompt being issued by the audio message facility;
      (iv) using the VR management application for providing any required response to the command prompt that was identified;
      (v) repeating the steps identified in subparagraphs (ii)-(iv) until access to messages stored by the audio message facility is obtained;
      (vi) retrieving the messages for the user from the audio message facility, so that the messages are available at the Web site;
      (vii) converting the messages into a digital format; and
      (viii) enabling the user to access the messages in digital format through the Web site.

14. The method of claim 13, wherein the step of using the VR management application comprises the step of the VR management application providing an audio response to the audio message facility, as required in response to the command prompt identified by the VR management application.

15. The method of claim 13, wherein the step of using the VR management application comprises the step of the VR management application providing a tone response to the audio message facility, as required in response to the command prompt identified by the VR management application, the tone response being selected to enable access of any messages stored by the audio message facility.

16. The method of claim 13, further comprising the step of automatically determining if a message has previously been retrieved to prevent a duplicate of a message that was previously retrieved during a prior connection by the user to the Web site from being again presented to the user during a subsequent connection by the user to the Web site.

17. The method of claim 16, wherein the step of determining if a message has previously been retrieved comprises the steps of:
   (a) creating message specific indicia for each message that is retrieved by the VR management application;
   (b) storing the message specific indicia in association with the message for which it was created;
   (c) correlating the indicia of each message being retrieved with the indicia of other messages;
   (d) determining that two messages are duplicates if the indicia of the two messages substantially match; and
   (e) not making a duplicate of a message that was previously retrieved available to the user.

18. The method of claim 13, further comprising the step of automatically causing a message stored at the audio message facility to be deleted after the message has been retrieved by the VR management application.

19. A system for enabling a user to interact with a VR system, wherein the VR system provides audio command prompts to which appropriate responses must be made in order for a user to achieve a desired interaction with the VR system, comprising:
   (a) a memory in which machine instructions and signatures are stored, each signature corresponding to at least a unique portion of a command prompt likely to be issued by the VR system;
   (b) a communication interface for communicating over one or more networks; and
   (c) a processor that is coupled to the memory and to the interface, the processor executing the machine instructions to carry out a plurality of functions, including:
      (i) enabling a user that is remote from the processor to establish a logical connection with the processor via the communication interface;
      (ii) interactively learning how to recognize and respond to the audio prompts that are issued by and received from the VR system over the communication interface, based upon a comparison of an audio command prompt received from the VR system with the signatures that are stored in the memory; and
      (iii) automatically performing the following functions to enable the processor to achieve a desired interaction with the VR system:
         (1) establishing a logical connection with the VR system using the communication interface;
         (2) receiving an audio signal from the VR system over the logical connection;
         (3) comparing the audio signal that was received with the signatures that are stored in the memory, to identify a command prompt that has been issued by the VR system and received by the processor;
         (4) providing any required response corresponding to the command prompt that was issued by the VR system; and
         (5) repeating the functions of subparagraphs (2)-(5) until the desired interaction with the VR system has been achieved.

20. The system of claim 19, wherein the machine instructions further cause the processor to establish the logical connection with the VR system according to a predefined schedule, so that the desired interaction occurs on a scheduled basis.

21. The system of claim 19, wherein the desired interaction that is carried out by the processor includes retrieving a voicemail of a user from the VR system.

22. The system of claim 21, wherein the machine instructions further cause the processor to email the voicemail to an email account of the user, over the network.

23. The system of claim 21, wherein the machine instructions further cause the processor to forward the voicemail to the user via a telephone call with the user.

24. The system of claim 21, wherein the machine instructions further cause the processor to forward the voicemail to an answering machine that is accessible by the user.

25. The system of claim 21, wherein the machine instructions further cause the processor to store the voicemail in the memory so that the voicemail can subsequently be accessed by the user.

26. The system of claim 25, wherein the machine instructions further cause the processor to enable the user to access the voicemail that has been stored, through a telephone call that communicates with the processor.

27. The system of claim 25, wherein the machine instructions further cause the processor to enable the user to access the voicemail that has been stored, using a Web browser that communicates over the network with the processor.

28. The system of claim 19, wherein the desired interaction comprises the forwarding of an audio message from the user to the VR system.

29. The system of claim 19, wherein the machine instructions cause the processor to recognize the audio command prompts that may be issued by the VR system by generating a corresponding discrete Fourier transform (DFT) for each audio command prompt likely to be issued by the VR system, so that each signature that is stored in the memory includes the corresponding DFT for that signature.

30. The system of claim 29, wherein the machine instructions further cause the processor to generate at least one DFT from the audio signal that is received from the VR system for comparison with DFTs included with the signatures that are stored, in order to identify the command prompt that has been issued by the VR system.

* * * * *